United States Patent
Igarashi et al.

(10) Patent No.: US 11,683,428 B2
(45) Date of Patent: Jun. 20, 2023

(54) INFORMATION PROCESSING APPARATUS FOR MANAGING SHEET INFORMATION ACCORDING TO PRESENCE OR ABSENCE OF A SHEET

(71) Applicant: CANON KABUSHIKI KAISHA, Tokyo (JP)

(72) Inventors: Hiroya Igarashi, Toride (JP); Nobuhiro Kawamura, Nagareyama (JP); Yusuke Kimura, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/820,529

(22) Filed: Mar. 16, 2020

(65) Prior Publication Data

US 2020/0314275 A1 Oct. 1, 2020

(30) Foreign Application Priority Data

Mar. 29, 2019 (JP) ............................. JP2019-068840

(51) Int. Cl.
*H04N 1/00* (2006.01)

(52) U.S. Cl.
CPC ...... *H04N 1/00692* (2013.01); *H04N 1/00694* (2013.01); *H04N 1/00755* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2012/0049442 A1* | 3/2012 | Sekiguchi | ................ | B65H 7/02 271/145 |
| 2015/0262050 A1* | 9/2015 | Kitora | ................ | G06K 15/4055 358/1.13 |
| 2016/0062291 A1* | 3/2016 | Tao | ..................... | G03G 15/6514 399/80 |
| 2018/0115676 A1* | 4/2018 | Shibuya | ............... | H04N 1/2369 |
| 2018/0152572 A1* | 5/2018 | Yano | .................. | H04N 1/00506 |

FOREIGN PATENT DOCUMENTS

| JP | 2016-51007 A | 4/2016 |
|---|---|---|
| JP | 2018069452 A | 5/2018 |
| JP | 2018-86766 A | 6/2018 |

* cited by examiner

*Primary Examiner* — Miya J Williams
*Assistant Examiner* — Pawan Dhingra
(74) *Attorney, Agent, or Firm* — Canon U.S.A., Inc. I.P. Division

(57) ABSTRACT

An information processing apparatus, to communicate with an image forming apparatus having a predetermined sheet feeding unit, includes a selection unit and a setting unit. The selection unit selects one storage method at least from among a first and second sheet information storage method. The setting unit executes a setting, based on the selected one storage method, for the predetermined sheet feeding unit. In the first sheet information storage method and after the sheet information is set for the predetermined sheet feeding unit, the setting of the sheet information is not cancelled when an absence of a sheet on the predetermined sheet feeding unit is detected. In the second sheet information storage method and after the sheet information is set for the predetermined sheet feeding unit, the setting of the sheet information is cancelled when an absence of a sheet on the predetermined sheet feeding unit is detected.

5 Claims, 17 Drawing Sheets

FIG.4

FIG.6
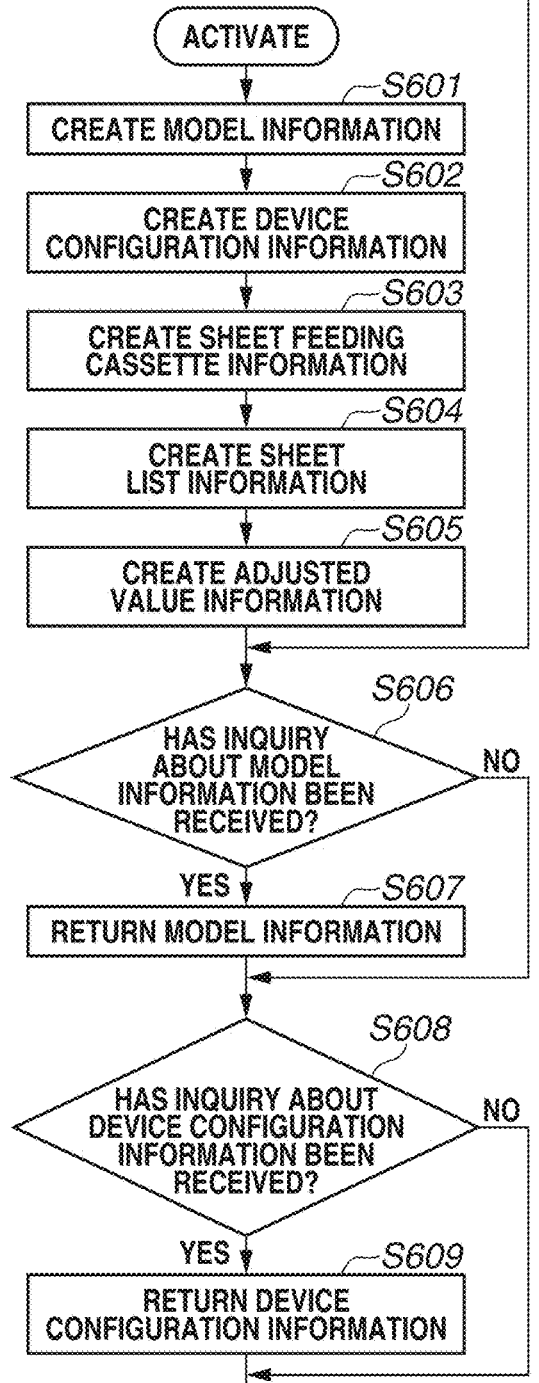
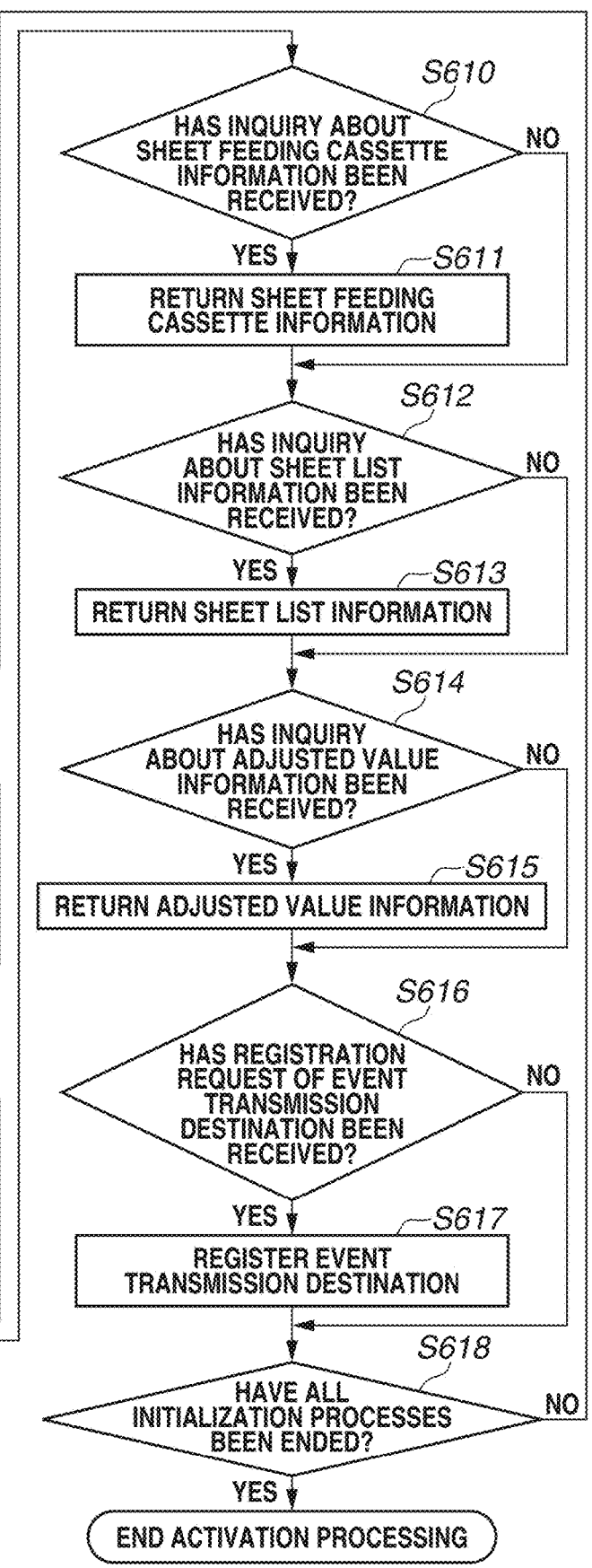

FIG. 7B

| NAME | GRAMMAGE | SIZE | Y(WIDTH) | X(HEIGHT) | SURFACE PROPERTY | CHARACTERISTICS | COLOR | GRAIN DIRECTION SETTING OF SHEET | SECOND SIDE OF TWO SIDES | OTHER ADJUSTMENT |
|---|---|---|---|---|---|---|---|---|---|---|
| Mohawk Color Copy Premi... | 105 | A4 | 11.69 | 8.27 | HIGH-QUALITY PAPER | NONE | WHITE | OFF | UNSET | UNADJUSTED |
| International Paper Hamm... | 90 | A4 | 11.69 | 8.27 | HIGH-QUALITY PAPER | PUNCHED PAPER | WHITE | OFF | UNSET | ADJUSTED |
| International Paper Hamm... | 75 | A4 | 11.69 | 8.27 | HIGH-QUALITY PAPER | NONE | WHITE | OFF | UNSET | UNADJUSTED |
| 1 Mohawk Color Copy Pre... | 105 | A3 | 11.69 | 16.54 | HIGH-QUALITY PAPER | NONE | WHITE | OFF | UNSET | UNADJUSTED |
| Domtar Cougar Digital Col... | 176 | A4 | 11.69 | 8.27 | HIGH-QUALITY PAPER | NONE | WHITE | OFF | UNSET | UNADJUSTED |
| Mohawk Color Copy 100%... | 105 | A4 | 11.69 | 8.27 | RECYCLED PAPER | NONE | WHITE | OFF | UNSET | UNADJUSTED |
| Boise Aspen 30% Recycled... | 75 | A3 | 11.69 | 16.54 | RECYCLED PAPER | NONE | WHITE | PARALLEL TO LONG SIDE | UNSET | UNADJUSTED |
| Sappi McCoy Gloss Digital... | 118 | 11x17 | 11.00 | 17.00 | BOTH SIDE COATED PAPER | NONE | WHITE | OFF | UNSET | UNADJUSTED |
| Verso Sterling Premium M... | 216 | 11x17 | 11.00 | 17.00 | MATT COATED PAPER | NONE | YELLOW | OFF | UNSET | ADJUSTED |
| Mohawk Options Navajo Br... | 90 | 12x18 | 12.00 | 18.00 | HIGH-QUALITY PAPER | NONE | WHITE | OFF | UNSET | UNADJUSTED |
| Mohawk LOOP INXWELL V... | 298 | A4 | 11.69 | 8.27 | EMBOSSED PAPER | NONE | WHITE | OFF | SET | UNADJUSTED |
| Mohawk Premium Polyeste... | 260 | A4 | 11.69 | 8.27 | BOTH SIDE COATED PAPER | NONE | YELLOW | OFF | UNSET | UNADJUSTED |
| Kernow Hydroprint Matt W... | 193 | LGL | 8.50 | 14.00 | FILM PAPER | NONE | WHITE | OFF | UNSET | UNADJUSTED |
| GPA White Semi-Gloss wit... | 216 | LGL | 8.50 | 14.00 | ONE SIDE COATED PAPER | NONE | WHITE | OFF | UNSET | UNADJUSTED |
| Finch Fine Color Copy (24... | 90 | LTR | 11.00 | 8.50 | HIGH-QUALITY PAPER | INDEX PAPER | WHITE | OFF | UNSET | UNADJUSTED |
| Holmberg DOCU COPY CO... | 199 | A4 | 11.69 | 8.27 | HIGH-QUALITY PAPER | INDEX PAPER | WHITE | OFF | UNSET | UNADJUSTED |
| Holmberg DOCU COPY CO... | 163 | LTR | 11.00 | 8.50 | BOTH SIDE COATED PAPER | NONE | WHITE | OFF | UNSET | UNADJUSTED |
| CTI Paper USA ASPIRE Pet... | 266 | B5 | 10.12 | 7.17 | HIGH-QUALITY PAPER | NONE | OTHER | OFF | UNSET | UNADJUSTED |
| International Paper Color c... | 271 | A4 | 11.69 | 8.27 | HIGH-QUALITY PAPER | NONE | WHITE | PARALLEL TO LONG SIDE | UNSET | UNADJUSTED |

SHEET LIST
VIEW ALL
SHEET SEARCH

REGISTER NEW SHEET...  COPY...  REGISTER FROM DATABASE...  EDIT...  DELETE...  CLOSE

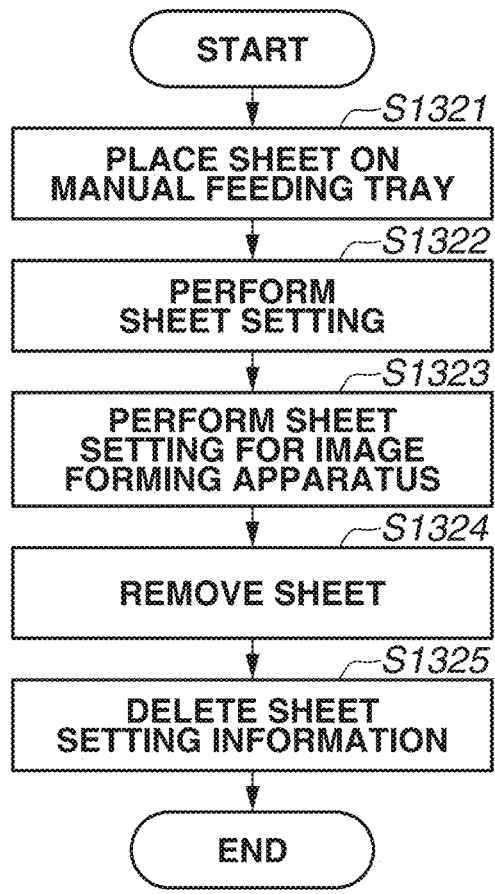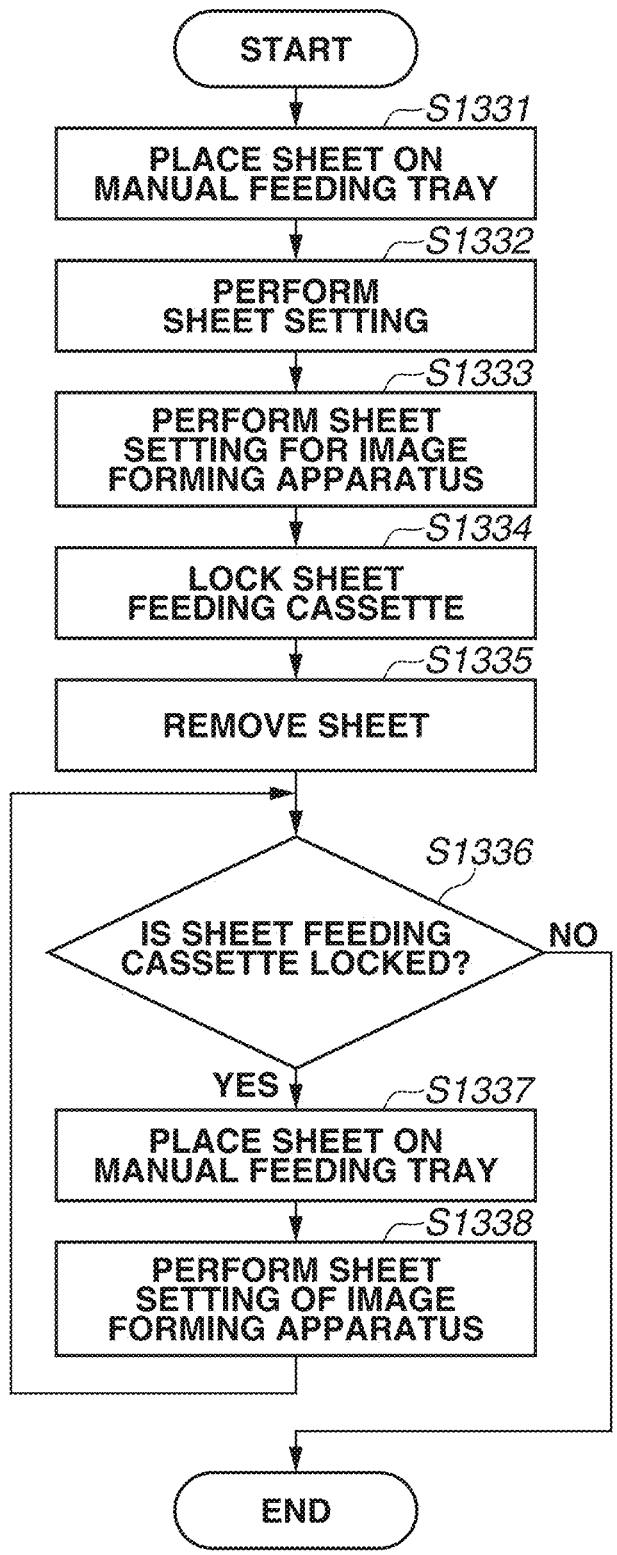

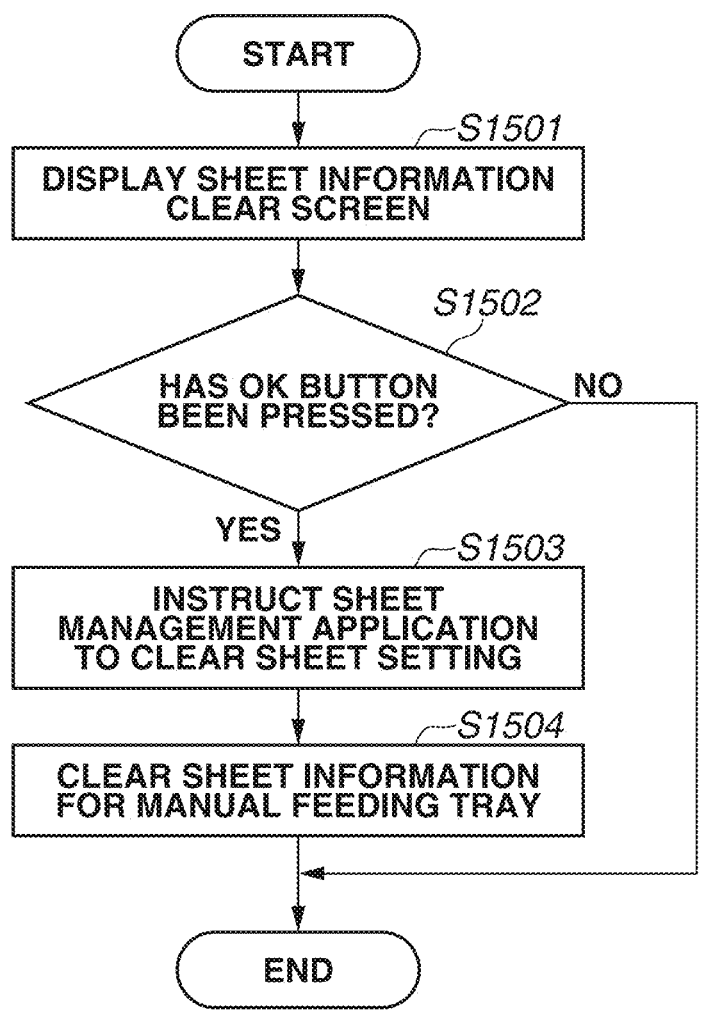

INFORMATION PROCESSING APPARATUS FOR MANAGING SHEET INFORMATION ACCORDING TO PRESENCE OR ABSENCE OF A SHEET

BACKGROUND

Field

The present disclosure relates to an apparatus and a method that can manage information regarding a sheet, such as a printable sheet, and a system to which these can be applied.

Description of the Related Art

In a production printing market, a digital multifunction peripheral (MFP) including various sheet feeding cassettes, such as a plurality of sheet feeding cassettes, a manual feeding tray, and an inserter, is used as an example of an image forming apparatus. An operator sets sheet information for a sheet feeding cassette of the MFP via an operation panel of the MFP or an operation unit of a printing control apparatus connecting to the MFP. The MFP can thereby perform printing on a desired sheet by a sheet consistent with the set sheet information being fed to the sheet feeding cassette. Examples of the sheet information include a name, a size, a grammage, and a surface property of a sheet. The sheet information can be managed based on identification information for identifying and handling a sheet on a user interface (UI) screen.

Various sheets can be set in a plurality of sheet feeding cassettes of an MFP in this manner, and thus, a structure for enhancing the operability is considered.

As an example, Japanese Patent Application Laid-Open No. 2018-86766 and Japanese Patent Application Laid-Open No. 2016-51007 discuss a system that enhances convenience for an operator by facilitating the setting of a desired sheet to be used in printing.

For a manual feeding tray and an inserter, various types of sheet information can be set when sheets are set.

In the case of remotely setting sheet information using a client computer before placing a sheet, a program of the client computer detects that the sheet has been placed, and sheet information can be set in an image forming apparatus. If, however, sheet information is set in the image forming apparatus each time a sheet is placed, when a sheet to be used is changed or an erroneous setting is made, the following issues arise. For example, it is necessary to go back to the client computer from the image forming apparatus to redo the setting. As another issue, sheet information remotely set for a manual feeding tray or an inserter is desired to be made settable also in the image forming apparatus as appropriate.

SUMMARY

The present disclosure has been devised in view of at least one of the above-described issues. The present disclosure is directed to flexibly setting sheet information for a sheet feeding unit from a client computer.

According to an aspect of the present disclosure, an information processing apparatus configured to communicate with an image forming apparatus, wherein the image forming apparatus includes a predetermined sheet feeding unit and is configured to perform a predetermined notification to a user in a case where sheet information is not set for the predetermined sheet feeding unit when placement of a sheet on the predetermined sheet feeding unit is detected, the information processing apparatus including a selection unit configured to select one storage method at least from among a first sheet information storage method and a second sheet information storage method, and a setting unit configured to execute a setting, based on the one storage method selected by the selection unit, for the predetermined sheet feeding unit of the image forming apparatus, wherein, in the first sheet information storage method and after the setting of the sheet information for the predetermined sheet feeding unit is made in the image forming apparatus, the setting of the sheet information is not cancelled in response to detection of an absence of a sheet on the predetermined sheet feeding unit, and wherein, in the second sheet information storage method and after the setting of sheet information for the predetermined sheet feeding unit is made in the image forming apparatus, the setting of the sheet information is cancelled in response to detection of an absence of a sheet on the predetermined sheet feeding unit.

Further features of the present disclosure will become apparent from the following description of exemplary embodiments with reference to the attached drawings.

BRIEF DESCRIPTION OF THE DRAWINGS

FIG. 4 is a diagram illustrating an example of a top screen of a sheet management application.

FIG. 6 is a diagram illustrating a flowchart example in activating an image forming apparatus.

FIGS. 7A and 7B are diagrams illustrating an example of a sheet list screen of the sheet management application.

FIGS. 13A, 13B, 13C, and 13D are diagrams each illustrating an example of user operation processing according to the first exemplary embodiment.

FIG. 15 is a diagram illustrating a flowchart example according to the second exemplary embodiment.

DESCRIPTION OF THE EMBODIMENTS

Hereinafter, exemplary embodiments of the present disclosure will be described with reference to the drawings.

Figure 1:
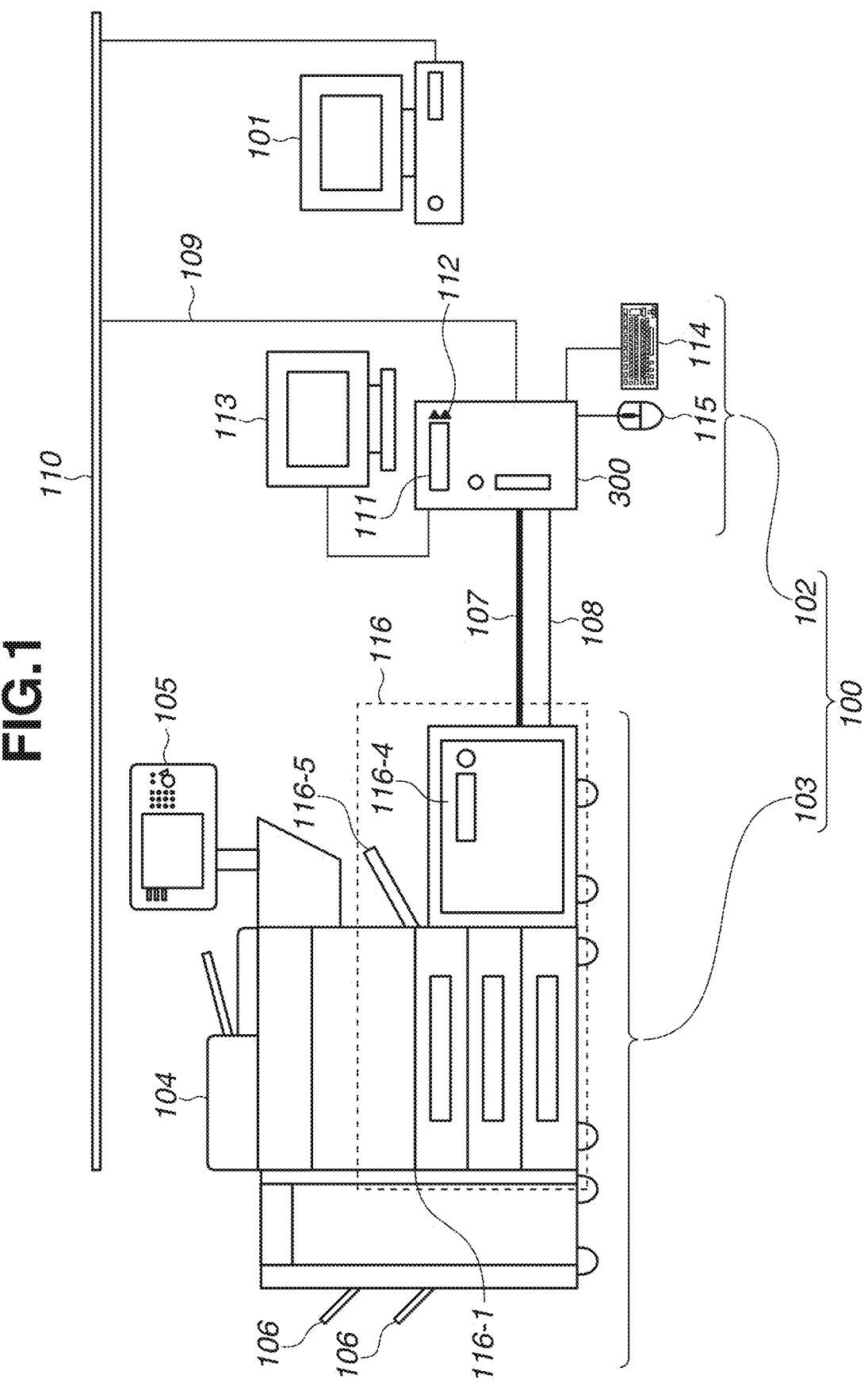
FIG. 1 is a diagram illustrating an example of a configuration of a printing system to which the present disclosure is applied.

A first exemplary embodiment of the present disclosure will be described below. FIG. 1 is a block diagram illustrating an overall configuration of an image forming system 100.

The image forming system 100 illustrated in FIG. 1 includes an image forming apparatus 103 and a printing control apparatus 102. The image forming system 100 is connected with a client computer 101 in such a manner that communication can be performed with the client computer 101. The client computer 101 and the printing control apparatus 102 are connected via a local area network (LAN) 110 using the Ethernet cable 109 in such a manner that communication can be performed therebetween. The printing control apparatus 102 and the image forming apparatus 103 are connected via an image video cable 107 and a control cable 108. In the present exemplary embodiment, the image forming apparatus 103 is not directly connected to the LAN 110. The image forming apparatus 103 and the client computer 101 communicate with each other via the printing control apparatus 102. The image forming apparatus 103 may be connected to the LAN 110. In other words, the image forming apparatus 103 may be connected in such a manner that communication can be directly performed with the client computer 101. The client computer 101 activates an application and issues a printing instruction to the image forming system 100. The printing control apparatus 102 performs image processing in cooperation with the image forming apparatus 103. The image forming apparatus 103 is a multifunction peripheral (MFP) having various functions. The image forming apparatus 103 can perform image processing in accordance with the client computer 101 and the printing control apparatus 102, and can also copy data read by a scanner unit 104 and transmit the read data to a shared folder. For scanning an image using the scanner unit 104, an operation panel 105 receives various instructions from a user via various keys. The operation panel 105 displays various types of information such as a scan state, via a panel. A sheet discharge unit 106 receives a sheet on which an image is formed, and discharges the received sheet. A controller 300 is a controller unit of the printing control apparatus 102. A display unit 111 of the printing control apparatus 102 displays information in the printing control apparatus 102. A hardware operation button unit 112 of the printing control apparatus 102 operates information being displayed on the display unit 111, through an operation of the button. Information to be displayed on the display unit 111 is used for the purpose of displaying minimum information required when the printing control apparatus 102 is operated (power-on operation or confirmation of IP address). An external display device 113 of the printing control apparatus 102 is a device, such as a liquid crystal monitor. The printing control apparatus 102 further includes a keyboard 114 and a pointing device 115. In the present exemplary embodiment, the pointing device 115 will be described as a mouse (registered trademark) 115. The display device 113 having a function of a position input device, such as a touch panel, may also serve as the mouse 115. Sheet feeding units 116-1, 116-4, and 116-5 (all will be collectively referred to as sheet feeding units 116) are devices storing sheets to be used for printing. If a printing instruction is received, one sheet feeding cassette is selected and a sheet is fed from the selected sheet feeding cassette. The number of sheet feeding units 116 varies depending on an optional configuration connecting to the image forming apparatus 103. A sheet storage unit of each of the sheet feeding units 116 is provided with a sensor for detecting whether a sheet is stored, and a sheet storage status of the sheet feeding units 116 can be notified to the printing control apparatus 102 as needed. As one of the sheet feeding units 116, a manual feeding tray, which is an example of a predetermined sheet feeding unit, is included.

Figure 2:
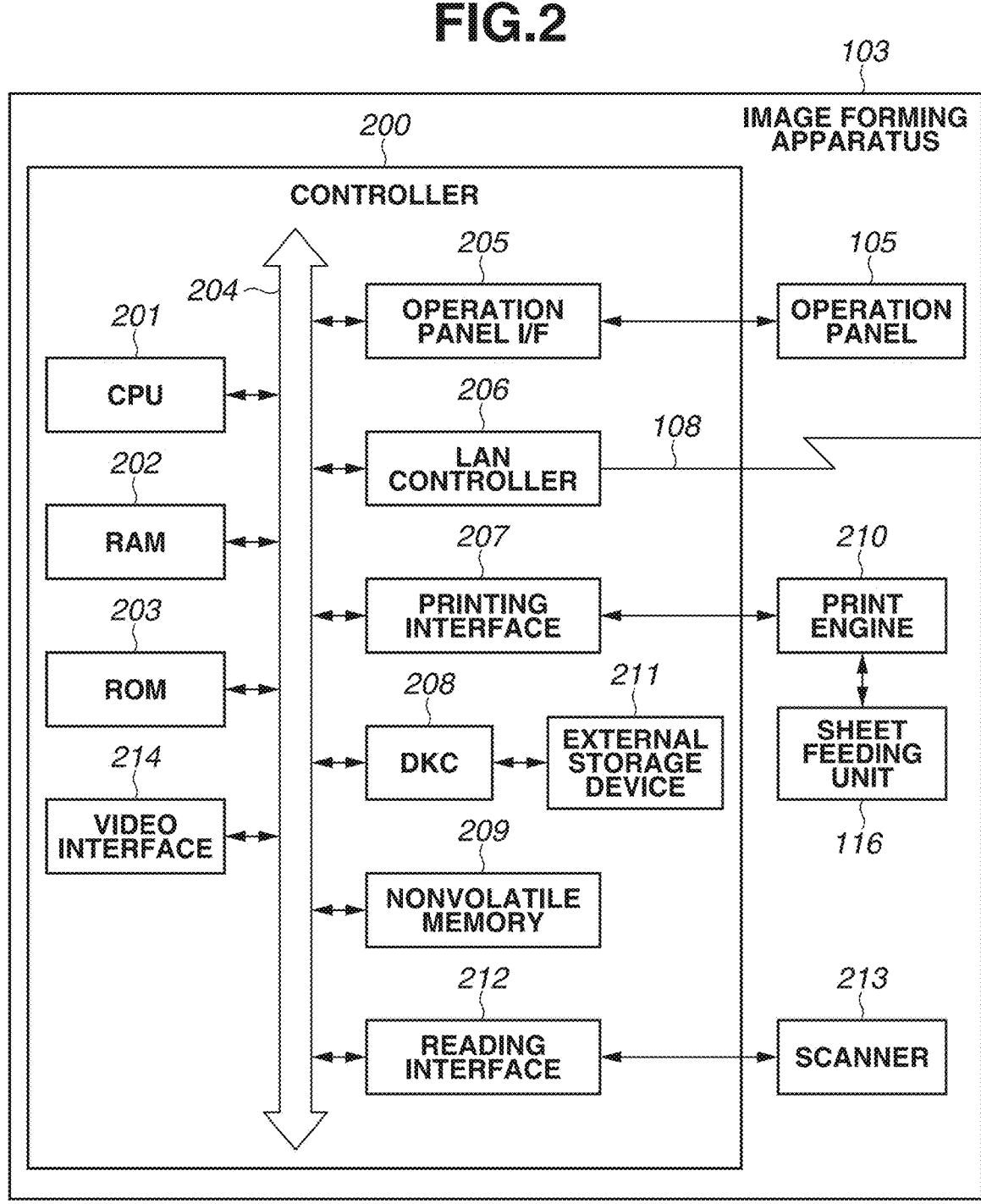
FIG. 2 is a block diagram illustrating a hardware configuration example of an image forming apparatus.

FIG. 2 is a block diagram illustrating a hardware configuration of the image forming apparatus 103. In the block diagram of the image forming apparatus 103 illustrated in FIG. 2, a controller 200 is a controller unit. The controller 200 includes a central processing unit (CPU) 201. The CPU 201 comprehensively controls access to various devices connected to a system bus 204, based on a control program stored in a read-only memory (ROM) 203 or an external storage device 211. The CPU 201 outputs an image signal serving as output information to a printing unit (print engine) 210 connected via a printing interface 207, and controls an image signal input from a reading unit (scanner) 213 connected via a reading interface 212. Via the printing interface 207, the CPU 201 controls the sheet feeding units 116 connected to the print engine 210, and acquires states of the sheet feeding units 116. The CPU 201 can communicate with the printing control apparatus 102 via a LAN controller 206 and the control cable 108. A random access memory (RAM) 202 mainly functions as a main memory and a work area of the CPU 201. Access to the external storage device 211, such as a hard disk drive (HDD) and an IC card, is controlled by a disk controller (DKC) 208. An HDD is used as a job storage region for storing an application program, font data, and form data, temporarily spooling a print job, and controlling a spooled job from the outside. Furthermore, the HDD is also used as a BOX data storage region for storing image data read from the scanner 213 or image data of a print job as BOX data, referring the BOX data from a network, and printing the BOX data. In the present exemplary embodiment, the HDD is used as an external storage device, and the HDD stores various logs, such as a job log and an image log. The user can input various types of information to an operation panel interface (I/F) 205 using software keys or hardware keys. A nonvolatile memory 209 stores various types of setting information set from a terminal via the operation panel I/F 205 or a network. A video interface 214 receives image data from the printing control apparatus 102. The image data is printed onto a sheet in a designated sheet feeding unit. Alternatively, if a sheet is placed on a manual sheet feeding unit and another predetermined condition is satisfied, the sheet is fed from the manual sheet feeding unit and the image data is printed onto the sheet. In other words, sheet information is conveyed to the print engine 210, and the print engine 210 controls the selection of a sheet feeding unit, sheet feeding, and image formation in accordance with the conveyed sheet information. At this time, print processing is performed in accordance with sheet information set to manual feeding. The manual sheet feeding unit is one of the plurality of sheet feeding units 116. Although the sheet feeding units 116 are schematically illustrated as one block in a simplified manner in the drawing, a plurality of sheet feeding units is actually provided.

The image forming apparatus 103 has the following two setting modes for the manual sheet feeding unit. The two setting modes include a one-time setting mode and a fixed setting mode. In the one-time setting mode, pop-up display appears on the operation panel I/F 205 to prompt a user to designate sheet information when sheets are placed. The designated setting is unchangeable until the sheets run out. When the sheets on the manual sheet feeding unit run out, the sheet information set in the image forming apparatus is cleared. The fixed setting mode is a user mode in which only a predetermined authenticated user of the image forming apparatus 103 is allowed to perform the setting. In the fixed setting mode, the fixing of sheets can be is set. In the present exemplary embodiment, a mode is set to the one-time setting mode by default. To avoid contention between the fixed setting mode and lock set by an application, the application may be enabled to cancel the fixed setting mode set in the image forming apparatus. The fixed setting mode may be made cancellable by an operation unit, such as an image forming apparatus panel when sheets are placed. A priority order does not change depending on an operation procedure, and thus, the setting may be executed in accordance with the following priorities: 1. setting fixing instruction issued from the image forming apparatus; 2. setting fixing instruction issued from an application; 3. temporary setting instruction issued from an application; and 4. setting designated using the pop-up display appearing when sheets are placed on the image forming apparatus. In other words, when sheets are fixed in the image forming apparatus, if sheets are placed after a setting is made with an application, the setting is overwritten with the fixed setting made with the image forming apparatus. The setting may be overwritten in accordance with an instruction for the fixed setting mode of the image forming apparatus even if the setting of the image forming apparatus is locked by the application.

Figure 3A:
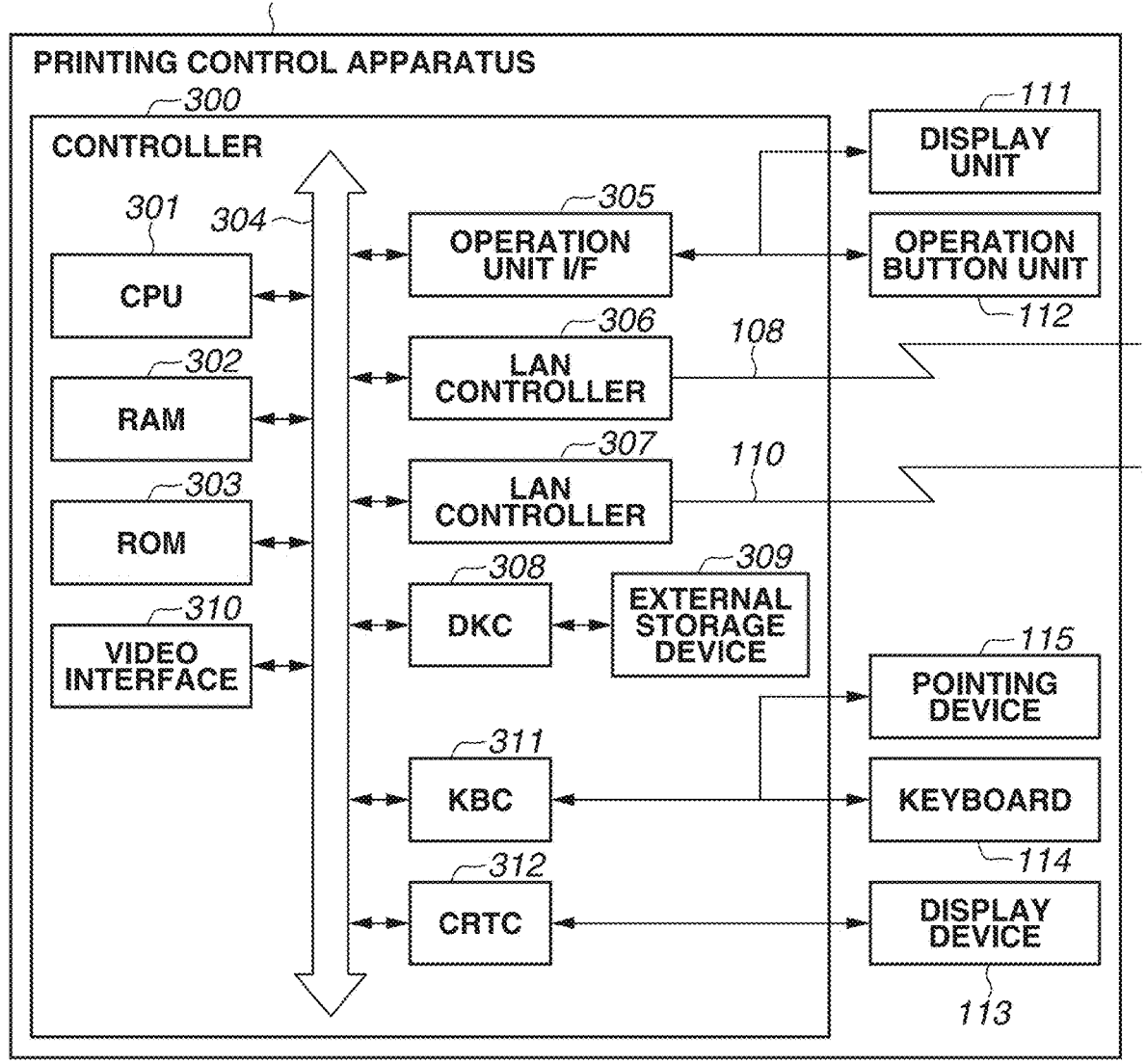
FIGS. 3A and 3B are block diagrams illustrating hardware and software configuration examples of a printing control apparatus.

FIG. 3A is a block diagram illustrating a hardware configuration of the printing control apparatus 102. In the block diagram of the printing control apparatus 102 illustrated in FIG. 3A, a controller 300 is a controller. The controller 300 includes a CPU 301. The CPU 301 comprehensively controls access to various devices connected to a system bus 304, based on a control program stored in a ROM 303 or an external storage device 309. The CPU 301 can communicate with the image forming apparatus 103 via a LAN controller 306 and the control cable 108. The CPU 301 can communicate with the client computer 101 on a network via a LAN controller 307 and the LAN 110. A RAM 302 mainly functions as a main memory and a work area of the CPU 301. Access to the external storage device 309, such as an HDD or an IC card is controlled by a DKC 308. An HDD stores an application program, font data, and form data, and temporarily spools a print job. The HDD is used as a job storage region for performing raster image processor (RIP) processing on a spooled job and restoring the resultant job. The user can input various types of information to an operation unit I/F 305 from the operation button unit 112, and the information can be displayed on the display unit 111. The input information is displayed on the display unit 111. A video interface 310 transmits image data having been subjected to the RIP processing, to the image forming apparatus 103. A keyboard controller (KBC) 311 performs processing related to input of information from the keyboard 114 or the mouse 115. A display control unit (CRTC) 312 includes a video memory thereinside, performs drawing into the video memory in accordance with an instruction issued from the CPU 301, and outputs image data drawn in the video memory, to the display device 113 as a video signal.

Figure 3B:
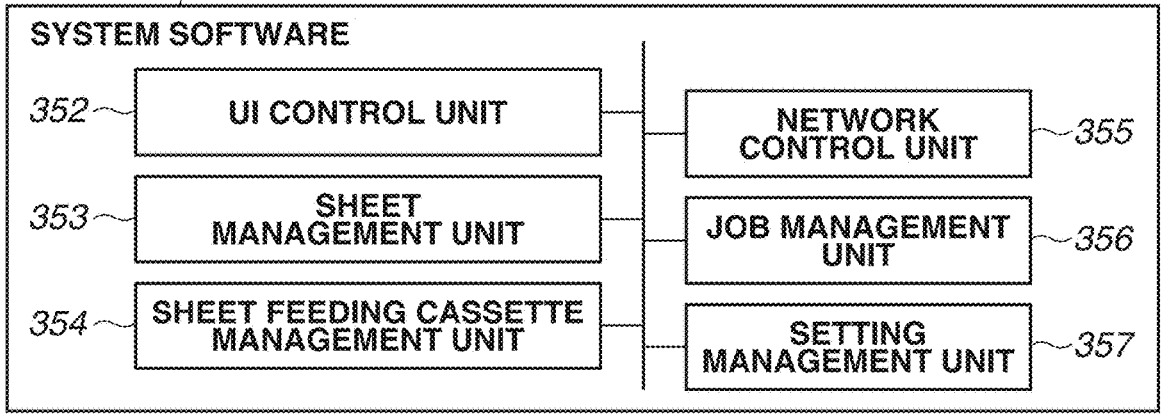

FIG. 3B is a block diagram illustrating a software configuration of the printing control apparatus 102. System software 351 controlling the printing control apparatus 102 includes a user interface (UI) control unit 352, a sheet management unit 353, a sheet feeding cassette management unit 354, a network control unit 355, a job management unit 356, and a setting management unit 357.

The UI control unit 352 controls a screen to be displayed in a sheet management system. In accordance with a system setting, the UI control unit 352 can control the screen so as to switch screen display wording or the display of a display unit system of a sheet size.

The sheet management unit 353 is communicates with the image forming apparatus 103, and manages acquired sheet information using a sheet setting management table. The sheet management unit 353 can edit sheet information in the sheet setting management table, add sheet information to the sheet setting management table, delete sheet information from the sheet setting management table, and search the sheet setting management table for sheet information. The sheet setting management table is used for managing sheet information for each sheet ID, and is managed in the external storage device 309 as a nonvolatile region. The sheet setting management table is assumed to be managed in the external storage device 309, but may be managed in the external storage device 211 of the image forming apparatus 103, and the printing control apparatus 102 may acquire the sheet setting management table from the image forming apparatus 103 and store the sheet setting management table into the RAM 302 while a program is being executed.

The sheet feeding cassette management unit 354 is a unit that communicates with the image forming apparatus 103, and manages acquired sheet feeding cassette information.

The network control unit 355 controls communication processing which is performed with the image forming apparatus 103 via the LAN controller 306, and communication processing which is performed with the client computer 101 on the network via the LAN controller 307.

The job management unit 356 is a unit that manages a print processing sequence and the order of jobs. The job management unit 356 manages a job received by the printing control apparatus 102, and controls data transfer for printing the received job to the image forming apparatus 103 via the LAN controller 306 and the video interface 310.

The setting management unit 357 manages a system setting related to the sheet management system. The system setting is, for example, a language setting of a screen display wording of the sheet management system, or a setting of a display unit system (millimeter or inch) of a sheet size, Each program in FIG. 3B is read from the external storage device 309 in FIG. 2 to the RAM 302 and executed by the CPU 301.

Figure 8:
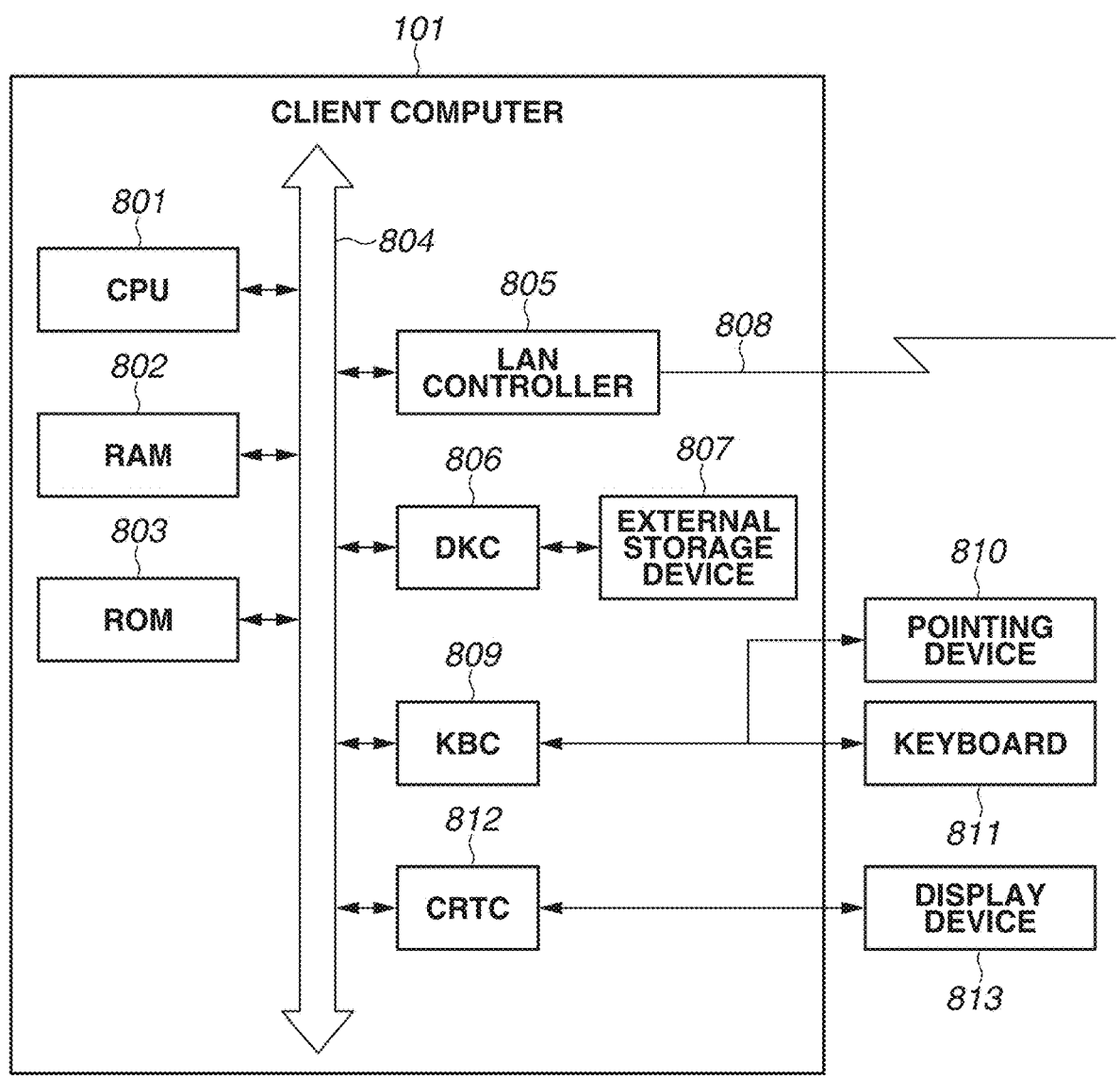
FIG. 8 is a block diagram illustrating a hardware configuration of a client computer.

FIG. 8 is a block diagram illustrating a hardware configuration of the client computer 101. The client computer 101 includes a CPU 801, a RAM 802, a ROM 803, system bus 804, a LAN controller 805, a DKC 806, an external storage device 807, a KBC 809, and a CRTC 812. Details of these components will be omitted because these components are similar to the above-described components of the printing control apparatus 102. A pointing device 810, such as a mouse, and a keyboard 811 are connected to the KBC 809, and a display device 813, such as a display, is connected to the CRTC 812. The LAN controller 805 is connected to a network 808 in such a manner that communication can be performed with the printing control apparatus 102 and the image forming apparatus 103. A sheet management application is stored in the external storage device 807 illustrated in FIG. 8, read into the RAM 802, and executed by the CPU 801. A UI illustrated in FIG. 4, 7A, 7B, 9, 11A, 11B, 11C, 11D, 11E, or 11F is thereby displayed on the display device 113.

Figure 4:
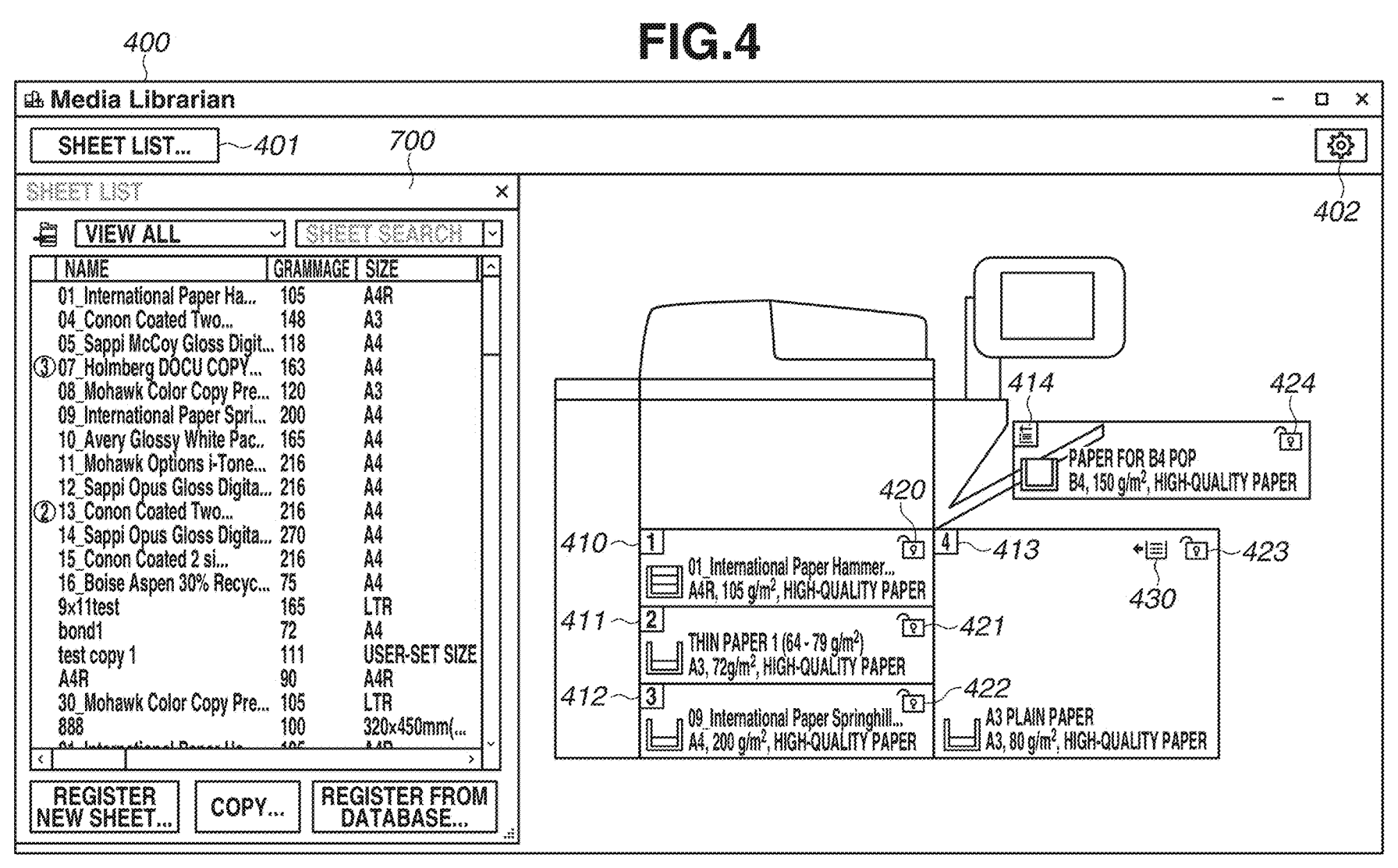

FIG. 4 illustrates a top screen of the sheet management application. The top screen is displayed when a start instruction of the sheet management application is issued by the client computer 101 or the printing control apparatus 102. The sheet management application operates on the printing control apparatus 102 or the client computer 101. The printing control apparatus 102 has a port forwarding function. By the port forwarding function, the following operation is performed if the sheet management application on the client computer 101 accesses the printing control apparatus 102. More specifically, the printing control apparatus 102 transfers a packet delivered to a port that is to be used in the sheet management application, to the image forming apparatus 103. Thus, even when the sheet management application is operated on the client computer 101, the sheet management application can be operated similarly to the sheet management application operated on the printing control apparatus 102. The following description will be provided assuming that the sheet management application is operated on the printing control apparatus 102 unless otherwise there is a difference in operation between the sheet management application on the printing control apparatus 102 and the sheet management application on the client computer 101. As described above, a similar operation can be performed also on the client computer 101 unless otherwise stated. A top screen 400 illustrated in FIG. 4 is a screen in a state in which information about a sheet feeding cassette of the image forming apparatus 103 is displayed. The top screen 400 is displayed when drawing is performed into a video memory in accordance with an instruction issued from the CPU 301, and image data drawn in the video memory is output to the display device 113 as a video signal.

The top screen 400 of the sheet management application is capable of displaying a screen in a state in which sheet feeding cassette information related to the image forming apparatus 103 is displayed. The top screen 400 illustrates a connection status of a device configuration of the image forming apparatus 103 that is connected to the printing control apparatus 102. When being activated, the sheet management application acquires device configuration information about the image forming apparatus 103, and displays an image based on the option information. In the present exemplary embodiment, FIG. 4 illustrates a state in which five sheet feeding cassettes and a sheet discharge device are connected. Sheet feeding cassette buttons 410 to 414 are created and arranged based on information regarding sheet feeding cassettes of the image forming apparatus 103 that has been acquired when the sheet management application is activated. Each sheet feeding cassette button 410 to 414 has a region for displaying information, such as a sheet remaining amount and a sheet name set to the corresponding sheet feeding cassette. If the controller 300 receives a sheet feeding cassette state change event from the image forming apparatus 103 when the state of a sheet feeding cassette of the image forming apparatus 103 changes, the controller 300 acquires sheet feeding cassette information again. The controller 300 redraws a display region for a sheet feeding cassette button in accordance with the acquired sheet feeding cassette information.

A sheet list button 401 is used for issuing an instruction for displaying a sheet list screen 700. In the present exemplary embodiment, if the sheet list button 401 is pressed, the controller 300 displays the sheet list screen 700 illustrated in FIGS. 7A and/or 7B, and displays the sheet list screen 700 foremost.

A setting button 402 is used for issuing an instruction for displaying a screen for changing a system setting of the sheet management application. In accordance with the system setting stored in the external storage device 309, the controller 300 displays a current system setting.

Figure 9:
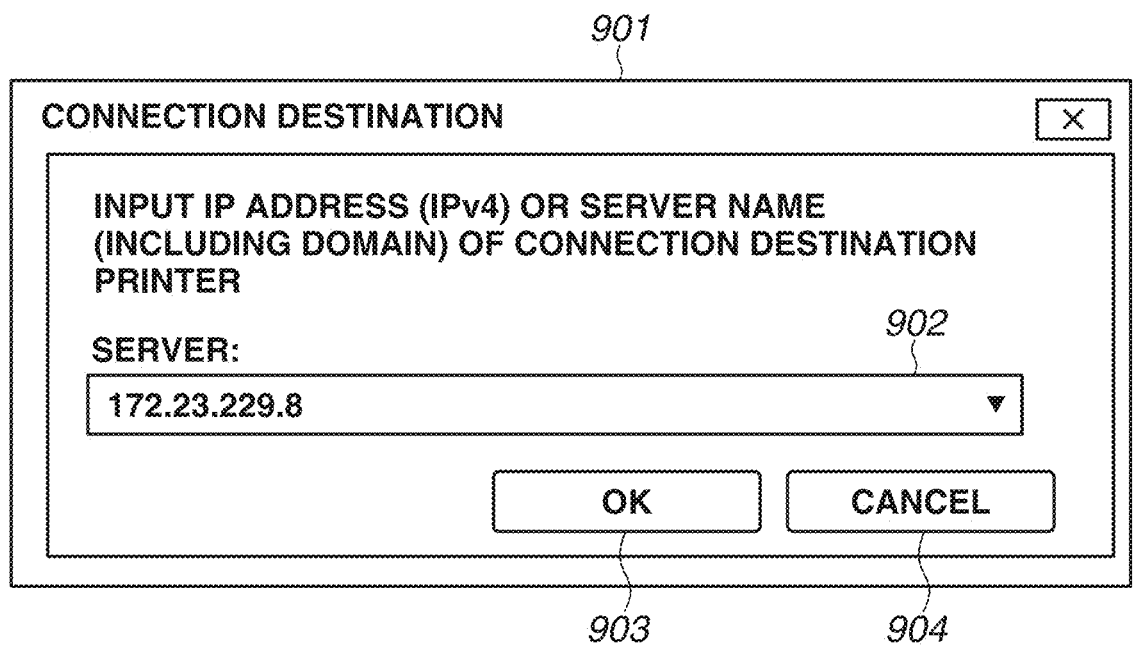
FIG. 9 is a diagram illustrating an example of a connection destination input screen of the sheet management application.

FIG. 9 illustrates a connection destination designation screen 901 for designating a printing control apparatus to which the sheet management application is to be connected.

The connection destination designation screen 901 illustrated in FIG. 9 is also displayed on the printing control apparatus 102 and the external display device 113 when the sheet management application is activated. The connection destination designation screen 901 includes an address input field 902, an OK button 903, and a cancel button 904. The address input field 902 is used for inputting an internet protocol (IP) address or a server name of a printing control apparatus as a connection destination. The OK button 903 is a button for connecting the sheet management application to the image forming apparatus in accordance with the setting designated in the address input field 902. If the connection is completed, the top screen 400 is displayed. Processes up to the connection will be described below with reference to FIG. 5. A cancel button 904 is a button for ending the sheet management application without connecting to the image forming apparatus.

Figure 5:
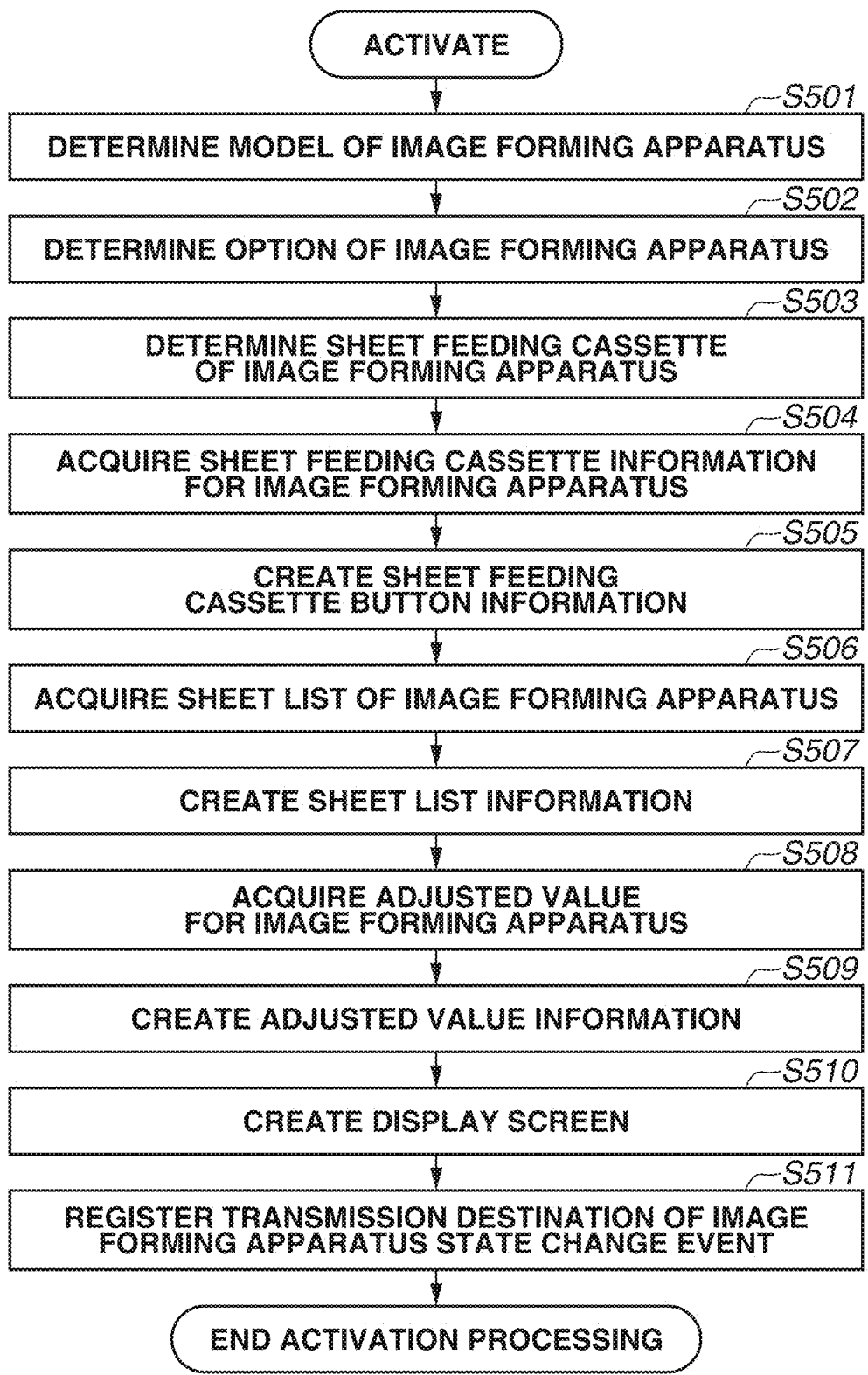
FIG. 5 is a diagram illustrating a connection processing example of the sheet management application.
Figure 7A:
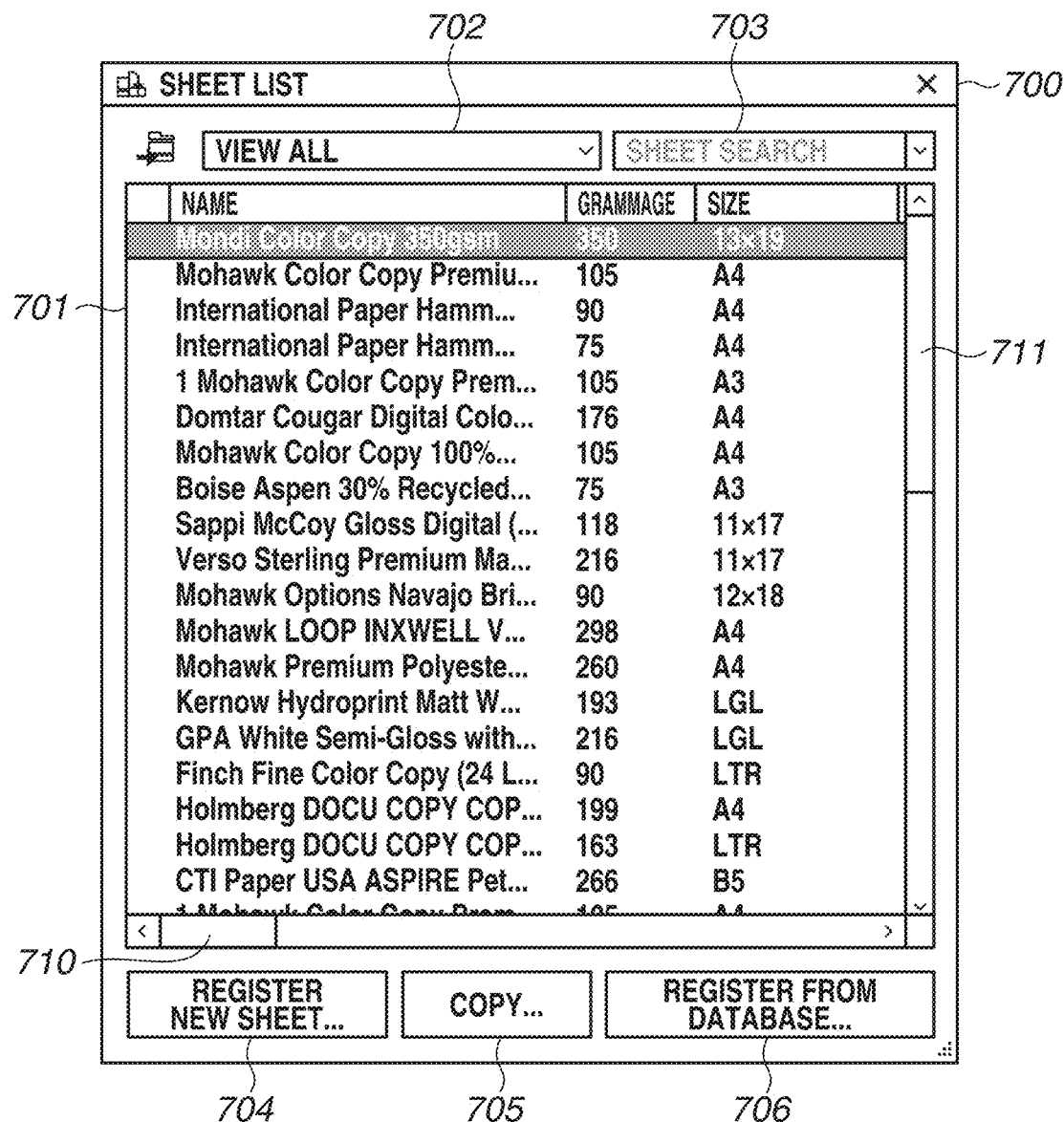

A program of the printing control apparatus 102 that is related to a flowchart illustrated in FIG. 5 is a printing management application. The sheet management application is stored in the external storage device 309 in FIG. 3A, read into the RAM 302, and executed by the CPU 301. A program of the client computer 101 that is related to the flowchart illustrated in FIG. 5 is a sheet management application. The program is also stored in the external storage device 807 in FIG. 8, read into the RAM 802, and executed by the CPU 801.

If the OK button 903 in FIG. 9 that is displayed by the sheet management application is pressed at this time, the following processing is executed on a connection destination designated in the address input field 902. In step S501, the sheet management application determines a model of the image forming apparatus 103 serving as a sheet management target. For example, a model is determined by acquiring device information from the image forming apparatus 103. After determining a model of the image forming apparatus 103, the sheet management application uses the determination result in creating a device configuration screen 400 and smoothing out a difference in specification between models. The sheet management application communicates with the image forming apparatus 103, and acquires model information from information returned in step S607. Furthermore, the sheet management application determines the model of the image forming apparatus 103 based on model determination information held by the sheet management application in advance. If a model has been determined in step S501, the processing proceeds to step S502. In step S502, the sheet management application communicates with the image forming apparatus 103, and acquires information regarding a device configuration from information returned in step S609. The sheet management application determines a device configuration connected to the image forming apparatus 103. Furthermore, the sheet management application uses the determination result when the device configuration screen 400 is created, when information about a sheet feeding unit is identified, or when a specification difference between models is smoothed out. If device configuration information has been acquired through the communication with the image forming apparatus 103, the processing proceeds to step S503. In step S503, the sheet management application performs communication and acquires sheet feeding unit information for the image forming apparatus 103 in step S611 in an activation process of the image forming apparatus 103. The sheet feeding unit information includes a sheet feeding unit configuration of, for example, a sheet feeding cassette, a manual feeding tray, and a long sheet tray, and information about a sheet set in each sheet feeding unit. Furthermore, the sheet management application determines sheet feeding units connected to the image forming apparatus 103 as a sheet management target, and identifies the number of connected sheet feeding units. If the sheet feeding units have been determined in step S503, the processing proceeds to step S504. In step S504, the sheet management application communicates with the image forming apparatus 103, and acquires, from information returned in step S611, sheet information set for each sheet feeding unit and information indicating whether the sheet feeding unit can be automatically drawn by pressing a sheet feeding unit open button. If sheet information relating to a sheet feeding unit has been acquired in step S504, the processing proceeds to step S505. In step S505, the sheet management application creates information regarding sheet feeding unit buttons on the sheet feeding cassette buttons 410 to 414 to be displayed on the top screen 400. In creating information regarding the buttons, the sheet management application creates a sheet feeding unit open button 430 on the sheet feeding cassette buttons 410 to 414 if the corresponding sheet feeding unit can be automatically drawn by pressing a sheet feeding unit open button on the sheet management application. The example illustrated in FIG. 4 is an example in which a sheet feeding cassette 4 corresponding to the sheet feeding cassette button 413 can be automatically drawn. If information regarding a sheet feeding unit button has been created in step S505, the processing proceeds to step S506. In step S506, the sheet management application communicates with the image forming apparatus 103 and acquires sheet list information returned in step S613. If sheet list information has been acquired in step S506, the processing proceeds to step S507. In step S507, the sheet management application creates information regarding the sheet list screen 700 to be displayed on the top screen 400. Each piece of sheet information in a sheet list includes information indicating whether the sheet information is settable for each sheet feeding unit of the image forming apparatus 103. If sheet list information has been created in step S507, the processing proceeds to step S508. In step S508, the sheet management application communicates with the image forming apparatus 103 and acquires an adjusted value for each adjustment from information returned in step S615, to use the adjusted value in adjusted value information display on the sheet list screen 700. If an adjusted value has been acquired, the processing proceeds to step S509. In step S509, the sheet management application creates a character string to be displayed in sheet information, based on the acquired adjusted value. If the adjusted value is not changed from a default value, "unadjusted" is displayed, and if the adjusted value is changed from a default value, "adjusted" is displayed. If adjusted value information has been created in step S509, the processing proceeds to step S510. In step S510, the sheet management application creates the top screen 400 based on the model information about the image forming apparatus 103 that has been acquired in step S501, the device configuration information about the image forming apparatus 103 that has been acquired in step S502, the sheet feeding unit button information created in step S505, the sheet list information created in step S507, and the adjusted value information created in step S509. After the screen has been created in step S510, the processing proceeds to step S511. In step S511, the sheet management application registers the printing control apparatus 102, for the image forming apparatus 103, as a transmission destination of a change notification event to be notified when sheet feeding unit information or sheet information of the image forming apparatus 103 is changed. If the registration has succeeded, wait processing for a change notification event is performed. If the wait processing for a change notification event is executed, the activation processing ends.

The processing has been described as an operation which is performed when the sheet management application is activated. Sheet feeding unit information, sheet list information, and an adjusted value of the image forming apparatus 103 can possibly be changed as needed during the use of the sheet management application. Accordingly, communication between the sheet management application and the image forming apparatus 103, and information update incidental to the communication are performed in the following manner. Each operation is performed as necessary regardless of whether the corresponding operation is operated in the sheet management application or the image forming apparatus 103, and information is synchronized between the sheet management application and image forming apparatus 103. The above-described system is an example of a printing system.

A program of the image forming apparatus 103 that is related to a flowchart illustrated in FIG. 6 is stored in the external storage device 211 in FIG. 2, read into the RAM 202, and executed by the CPU 201. If the image forming apparatus 103 is activated, the processing proceeds to step S601. In step S601, the image forming apparatus 103 acquires model information about itself from the external storage device 211, and creates the model information as returnable data. If data about model information has been created in step S601, the processing proceeds to step S602. In step S602, the image forming apparatus 103 acquires information about a device configuration connected to itself, from the external storage device 211, and creates the information as returnable data. If data about device configuration information has been created in step S602, the processing proceeds to step S603. In step S603, the image forming apparatus 103 acquires sheet feeding unit information about itself from the acquired device configuration information and the external storage device 211, and creates the sheet feeding unit information as returnable data. If data about sheet feeding unit information has been created in step S603, the processing proceeds to step S604. In step S604, the image forming apparatus 103 acquires sheet list information about itself from the external storage device 211, and creates the sheet list information as returnable data. If data about sheet list information has been created in step S604, the processing proceeds to step S605. In step S605, the image forming apparatus 103 acquires adjusted value information about itself from the external storage device 211, and creates adjusted value information as returnable data. The acquisition of adjusted value information is executed for all items adjustable in the image forming apparatus 103. If data about adjusted value information has been created in step S605, the processing proceeds to step S606. In step S606, the image forming apparatus 103 determines whether an inquiry about model information has been received from the printing control apparatus 102. If an inquiry about model information has been received in step S501 in the activation process of the sheet management application (YES in step S606), the processing proceeds to step S607. In step S607, the image forming apparatus 103 returns the model information created in step S601, and the processing proceeds to step S608. If an inquiry about model information has not been received in step S606 (NO in step S606), the processing proceeds to step S608 as well. In step S608, the image forming apparatus 103 determines whether an inquiry about device configuration information has been received from the printing control apparatus 102. If an inquiry about device configuration information has been received in step S502 in the activation process of the sheet management application (YES in step S608), the processing proceeds to step S609. In step S609, the image forming apparatus 103 returns the device configuration information created in step S602, and the processing proceeds to step S610. If an inquiry about device configuration information has not been received in step S608 (NO in step S608), the processing proceeds to step S610 as well. In step S610, the image forming apparatus 103 determines whether an inquiry about sheet feeding unit information has been received from the printing control apparatus 102. If an inquiry about sheet feeding unit information has been received in steps S503 and S504 in the activation process of the sheet management application (YES in step S610), the processing proceeds to step S611. Furthermore, in step S611, the image forming apparatus 103 returns the sheet feeding unit information created in step S603, to the printing control apparatus 102, and the processing proceeds to step S612. If an inquiry about sheet feeding unit information has not been received in step S610 (NO in step S610), the processing proceeds to step S612 as well, in step S612, the image forming apparatus 103 determines whether an inquiry about sheet list information has been received from the printing control apparatus 102. If an inquiry about sheet list information has been received in steps S506 and S507 in the activation flow of the sheet management application (YES in step S612), the processing proceeds to step S613. Furthermore, in step S613, the image forming apparatus 103 returns the sheet list information created in step S604, to the sheet management application, and the processing proceeds to step S614, If an inquiry about sheet list information has not been received in step S612 (NO in step S612), the processing proceeds to step S614 as well. In step S614, the image forming apparatus 103 determines whether an inquiry about adjusted value information has been received from the printing control apparatus 102. If an inquiry about adjusted value information has been received in step S508 in the activation process of the sheet management application (YES in step S614), the processing proceeds to step S615. In step S615, the image forming apparatus 103 returns the adjusted value information to the printing control apparatus 102, and the processing proceeds to step S616. If an inquiry about adjusted value information has not been received in step S614 (NO in step S614), the processing proceeds to step S616 as well. In step S616, the image forming apparatus 103 determines whether a registration request of information about a transmission destination to be used in transmitting an event when the state of the image forming apparatus 103 has been changed from the printing control apparatus 102. If a registration request of an event transmission destination has been received (YES in step S616), the processing proceeds to step S617. In step S617, the image forming apparatus 103 adds the printing control apparatus 102 to a transmission destination of an event, and the processing proceeds to step S618. If a registration request of an event transmission destination has not been received in step S616 (NO in step S616), the processing proceeds to step S618 as well. In step S618, the image forming apparatus 103 determines whether all the processes in steps S606, S608, S610, S612, S614, and S616 have succeeded. If all the processes have succeeded (YES in step S618), initialization processing ends, if all the processes have not succeeded (NO in step S618), the processing returns to step S606.

The sheet feeding unit 116 in the present exemplary embodiment is an example of a sheet feeding unit, and may be a sheet feeding unit having a different mechanism, such as an inserter or a manual feeding tray. The configuration of the sheet feeding unit is not limited.

The description will return to FIG. 4. If the sheet feeding cassette button 410 corresponding to a sheet feeding unit 1 is pressed using the mouse 115, a sheet setting screen for the sheet feeding unit 1 is displayed, and the sheet setting of the sheet feeding unit 1 can be performed and a setting value of a set sheet can be changed. Because the sheet feeding cassette buttons 411 to 414 are similar to the sheet feeding cassette button 410, the description will be omitted. A lock button 420 is a lock button of a sheet feeding cassette setting. While a sheet setting can be changed in an unlocked state, a sheet setting in the sheet management application cannot be changed in a locked state. Lock buttons 421 to 424 are similar to the lock button 420, and thus, descriptions thereof will be omitted. It should be appreciated that sheet feeding units include all sheet feeding cassettes, such as an inserter, which will not be described in detail in the present exemplary embodiment. In the following description, a description of the use of the mouse 115 in operating an application, such as the press of a button, will be omitted. Needless to say, an application is operated using such an input device.

Figure 10:
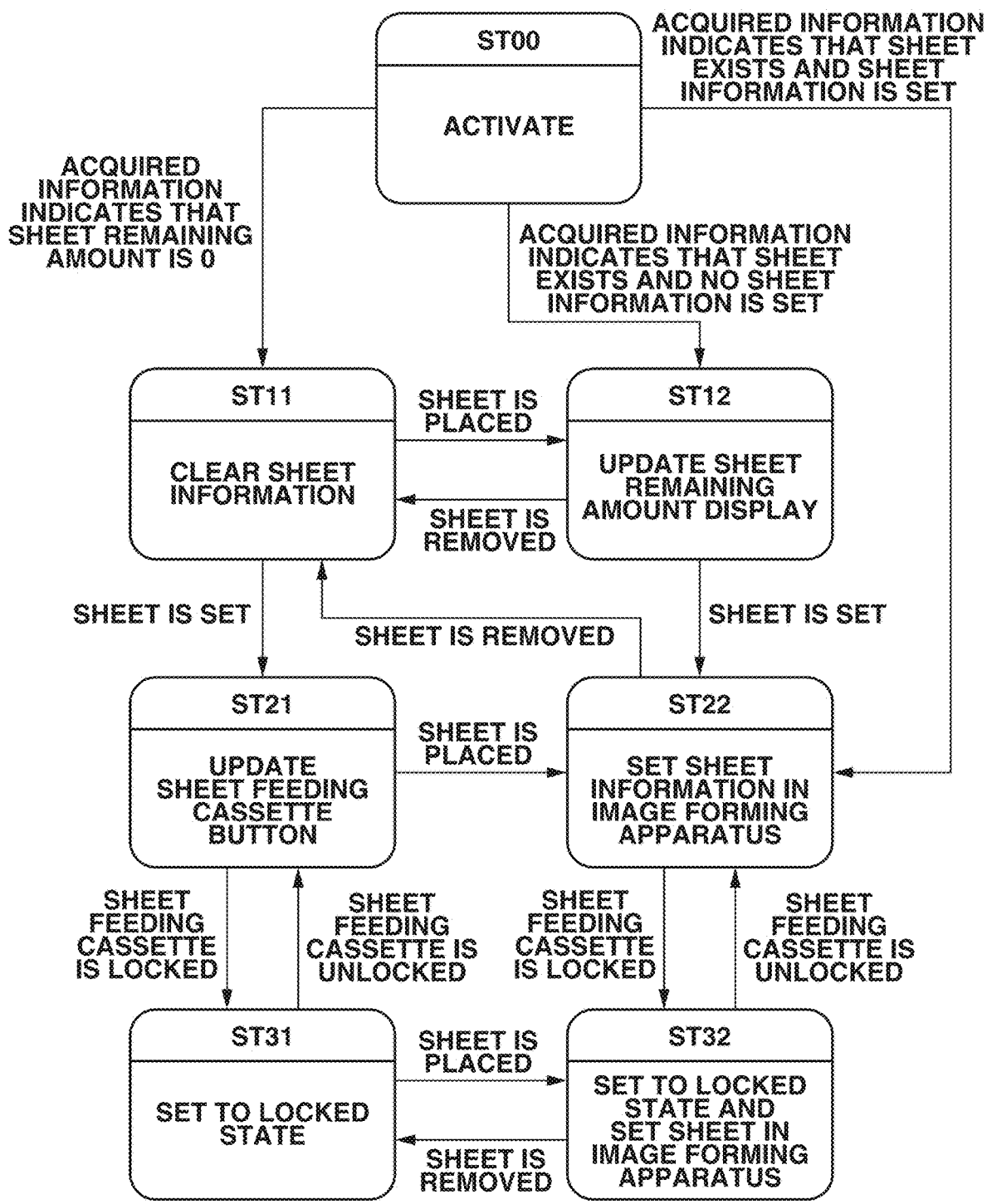
FIG. 10 is a diagram illustrating a state transition example according to a first exemplary embodiment.
Figures 11A, 11B:
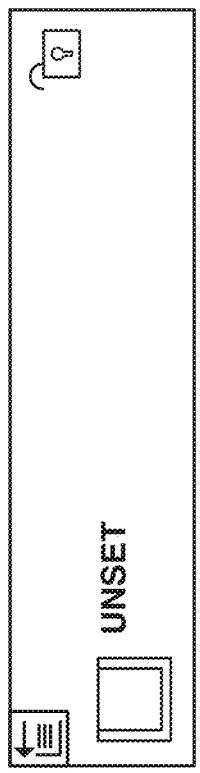
FIGS. 11A, 11B, 11C, 11D, 11E, and 11F are diagrams illustrating screen examples of a sheet feeding cassette button of the sheet management application.
Figures 11C, 11D:
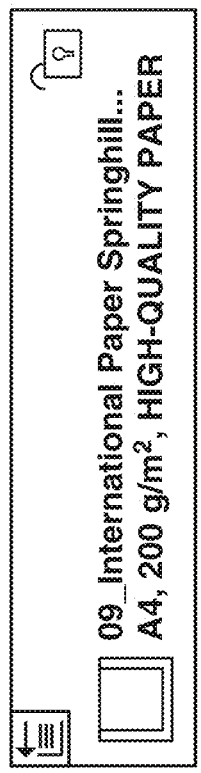
Figure 12:
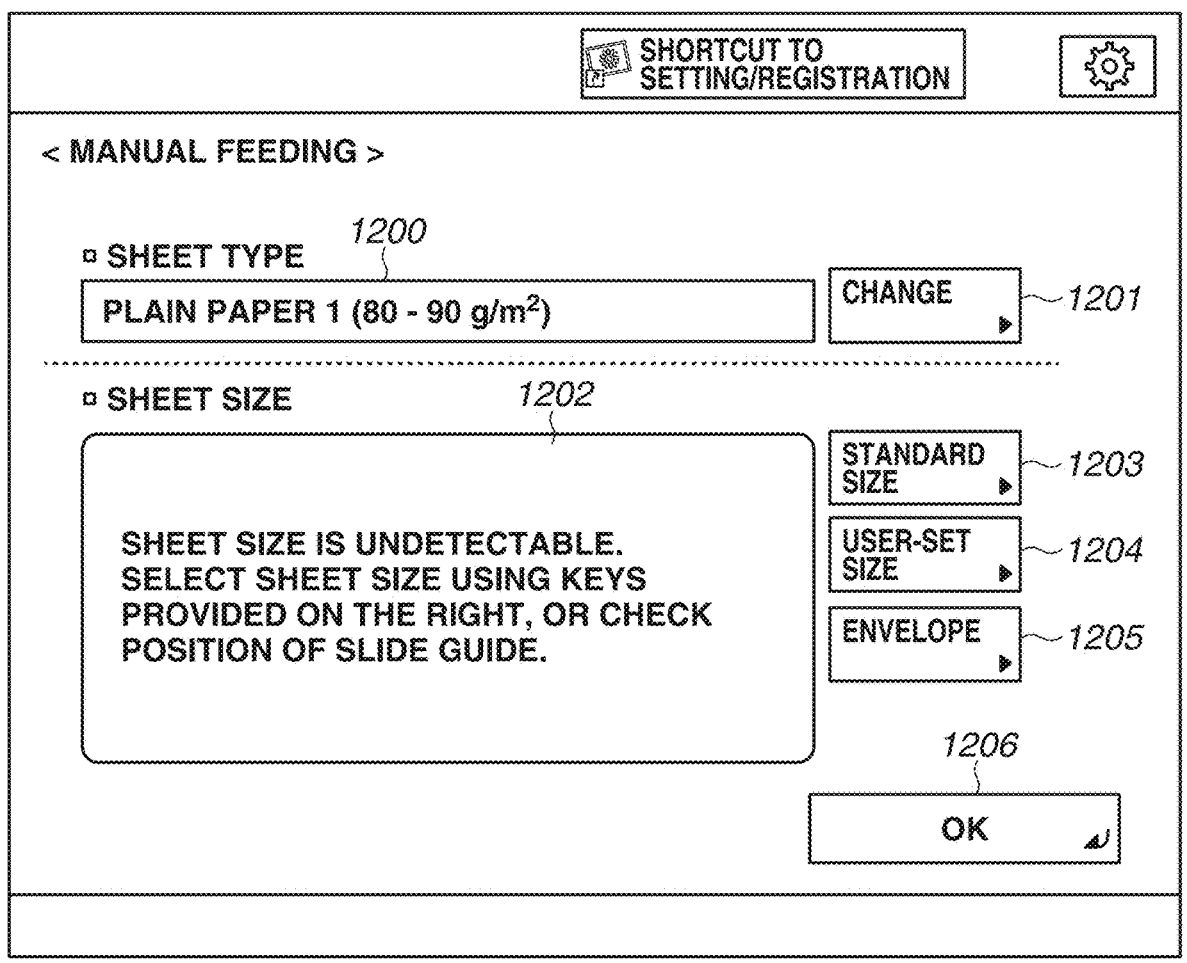
FIG. 12 is a diagram illustrating an example of a sheet setting screen of a manual feeding tray on an operation panel.

FIG. 10 is a state transition diagram of the sheet management application that is related to a sheet setting of a manual feeding tray. As in the description of the top screen of the sheet management application, a description will be provided of a case where the sheet management application is operated on the printing control apparatus 102. The sheet management application is similarly operated on a client personal computer (PC). Processing in the state transition diagram illustrated in FIG. 10 is executed by the CPU 301. When the sheet management application is activated, the processing starts from step ST00. In step ST00, the CPU 301 acquires information about the manual feeding tray 116-5 from the image forming apparatus 103. If no sheet is placed on the manual feeding tray 116-5 ("ACQUIRED INFORMATION INDICATES THAT SHEET REMAINING AMOUNT IS 0" in step ST00), the processing proceeds to step ST11. If a sheet exists but no sheet information is set ("ACQUIRED INFORMATION INDICATES THAT SHEET EXISTS AND NO SHEET INFORMATION IS SET" in step ST00), the processing proceeds to step ST12. A state in which a sheet exists but no sheet information is set indicates a state before a sheet information setting is performed on a screen as illustrated in FIG. 12, for example, that is displayed on the operation panel 105 after a sheet is placed on the manual feeding tray 116-5. In step ST12, the screen illustrated in FIG. 12 can be displayed on the operation panel 105 of the image forming apparatus. A sheet type display region 1200 is a region in which a name of a sheet type to be set is displayed. A sheet type change button 1201 is used for changing a sheet type. A sheet size information display region 1202 is a region in which information about a sheet size is displayed. A standard size button 1203 is a button for setting a standard sheet size such as A4 or LTR. A user-set size button 1204 is used for setting a nonstandard sheet size. An envelope button 1205 is used for setting an envelope size. An OK button 1206 is used for completing a sheet setting. If a sheet setting is performed and completed in step ST12 ("SHEET IS SET" in step ST12), the processing proceeds to step ST22. In a similar manner, if the information acquired in step ST00 indicates that a sheet exists and sheet information is set ("ACQUIRED INFORMATION INDICATES THAT SHEET EXISTS AND SHEET INFORMATION IS SET" in step ST00), the processing proceeds to step ST22. In step ST11, sheet information about the manual feeding tray is cleared, and the sheet feeding cassette button 414 for the manual feeding tray displays information as illustrated in FIG. 11A. In other words, under the control of the sheet management application, the information about the sheet feeding cassette button 414 in FIG. 4 that is displayed on the display device 113 or 813 changes to the display as illustrated in FIG. 11A. If it is determined in step ST11 that a sheet has been placed on the manual feeding tray 116-5 and a notification indicating that a sheet exists has been received from the image forming apparatus 103 ("SHEET IS PLACED" in step ST11), the processing proceeds to step ST12. If it is determined in step ST11 that a sheet has been set by an operator in the manual feeding tray corresponding to the sheet feeding cassette button 414 ("SHEET IS SET" in step ST11), the processing proceeds to step ST21. In step ST12, the CPU 301 updates the sheet remaining amount display, and changes information about the sheet feeding cassette button 414 to display as illustrated in FIG. 11B. If it is determined in step ST12 that a sheet has been removed from the manual feeding tray 116-5, that is to say, if a sheet remaining amount of 0 has been notified from the image forming apparatus 103 ("SHEET IS REMOVED" in step ST12), the processing proceeds to step ST11. If it is determined in step ST12 that a sheet has been set, by the operator, in the manual feeding tray corresponding to the sheet feeding cassette button 414 ("SHEET IS SET" in step ST12), the processing proceeds to step ST22. In step ST21, the CPU 301 changes information displayed in the sheet feeding cassette button 414 to display as illustrated in FIG. 11C. In other words, under the control of the sheet management application, the information about the sheet feeding cassette button 414 in FIG. 4 that is displayed on the display device 113 or 813 changes to the display as illustrated in FIG. 11C. That is to say, the CPU 301 displays sheet information set by the operator. If it is determined in step ST21 that a sheet has been placed on the manual feeding tray 116-5 and a notification indicating that a sheet exists has been received from the image forming apparatus 103 ("SHEET IS PLACED" in step ST21), the processing proceeds to step ST22. If it is determined in step ST21 that the lock button 424 has been pressed by the operator ("SHEET FEEDING CASSETTE IS LOCKED" in step ST21), the processing proceeds to step ST31. The application enters a locked state.

In step ST32 (a sheet is set and the application is in the locked state), a sheet is removed from the manual feeding tray. If the sheet is removed ("SHEET IS REMOVED" in step ST32), information set in the image forming apparatus 103 is once cleared and the processing proceeds to step ST31 (the application is in the locked state). In step ST31, the application detects that a sheet has been placed again, based on a notification from the image forming apparatus 103. If the application detects that a sheet has been placed ("SHEET IS PLACED" in step ST31), the application writes the locked setting into the image forming apparatus 103. In other words, the application is locked in step ST31 (no sheet). In this state, no sheet may be set on the image forming apparatus side.

In the state transition diagram (steps ST11, ST21, ST31), a sheet setting is not set in the image forming apparatus 103. In the state transition diagram (steps ST12, ST22, ST32), a sheet setting is set in the image forming apparatus 103. If the lock button 424 is designated in the client computer or the printing control apparatus 102, an instruction may be issued in such a manner that the setting designated to be locked is also locked in the image forming apparatus 103.

Figures 11E, 11F:
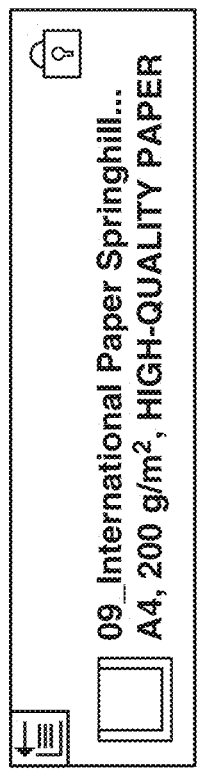

In step ST22, the CPU 301 sets sheet information set for the sheet feeding cassette button 414, also in the image forming apparatus 103, and changes information for the sheet feeding cassette button 414 to display as illustrated in FIG. 11D. The image forming apparatus 103 receives a sheet feeding cassette setting instruction from the sheet management application, and the CPU 201 updates the display on the operation panel 105 via the operation panel I/F 205. Specifically, the display on the sheet setting screen of the manual feeding tray as illustrated in FIG. 12 is deleted. If it is determined in step ST22 that a sheet has been removed from the manual feeding tray 116-5, that is to say, a sheet remaining amount of 0 has been notified from the image forming apparatus 103 ("SHEET IS REMOVED" in step ST22), the processing proceeds to step ST11. If it is determined in step ST22 that the lock button 424 has been pressed ("SHEET FEEDING CASSETTE IS LOCKED" in step ST22), the processing proceeds to step ST32. If it is determined in step ST22 that the lock button 424 has been pressed ("SHEET FEEDING CASSETTE IS LOCKED" in step ST22), the sheet management application is set so as to lock the setting of the corresponding sheet feeding cassette. In step ST31, the CPU 301 changes information displayed in the sheet feeding cassette button 414 to display as illustrated in FIG. 11E. It can be seen that an icon shifts to the locked state. Furthermore, the CPU 301 performs control so as to disable a sheet setting operation on the sheet feeding cassette button 414. Specifically, the CPU 301 prevents a sheet list from being displayed even if a drag-and-drop operation is performed or a sheet button is pressed on the sheet list screen 700. If it is determined in step ST31 that the lock button has been pressed ("SHEET FEEDING CASSETTE IS LOCKED" in step ST31), the processing proceeds to step ST21. If it is determined in step ST31 that a sheet has been placed on the manual feeding tray 116-5 and a notification indicating that a sheet exists has been received from the image forming apparatus 103 ("SHEET IS PLACED" in step ST31), the processing proceeds to step ST32. In step ST32, the CPU 301 changes information displayed in the sheet feeding cassette button 414 to display as illustrated in FIG. 11F, and disables a sheet setting operation on the sheet feeding cassette button 414. The CPU 301 sets the sheet information set for the sheet feeding cassette button 414, in the image forming apparatus 103. If it is determined in step ST32 that a sheet has been removed from the manual feeding tray 116-5, that is, if a sheet remaining amount of 0 has been notified from the image forming apparatus 103 ("SHEET IS REMOVED" in step ST32), the processing proceeds to step ST31. If it is determined in step ST32 that the lock button has been pressed, that is, if it is determined that the locked state has been canceled ("SHEET FEEDING CASSETTE IS UNLOCKED" in step ST32), the processing proceeds to step ST22. By performing processing related to the sheet feeding cassette button 414 and the lock button 424 for the manual feeding tray in the above-described manner, the following processes are executed.

In the sheet management application which is operated by the operator, operation processing as illustrated in FIGS. 13A, 13B, 13C, and 13D become executable. In step S1301 in FIG. 13A, the sheet management application receives a sheet setting from the operator. After that, in step S1302, the sheet management application receives a notification indicating that the image forming apparatus detects the placement of a sheet. In step S1303, the sheet management application sets the sheet setting in the image forming apparatus. The sheet setting is completed at the time point, and thus, printing becomes executable. Subsequently, in step S1304, the sheet management application receives a notification indicating a sheet remaining amount of 0, from the image forming apparatus 103. The notification indicating a sheet remaining amount of 0 is issued when a sheet is removed or sheets are used and run out. If the sheet management application receives the notification indicating a sheet remaining amount of 0, in step S1305, the sheet management application deletes sheet setting information for the manual feeding tray.

If the operator places a sheet at this time, the sheet setting screen as illustrated in FIG. 12 is displayed on the operation panel 105 of the image forming apparatus 103. Thus, it becomes possible for the operator to perform a sheet setting in front of the image forming apparatus without operating the sheet management application.

Figure 13A:
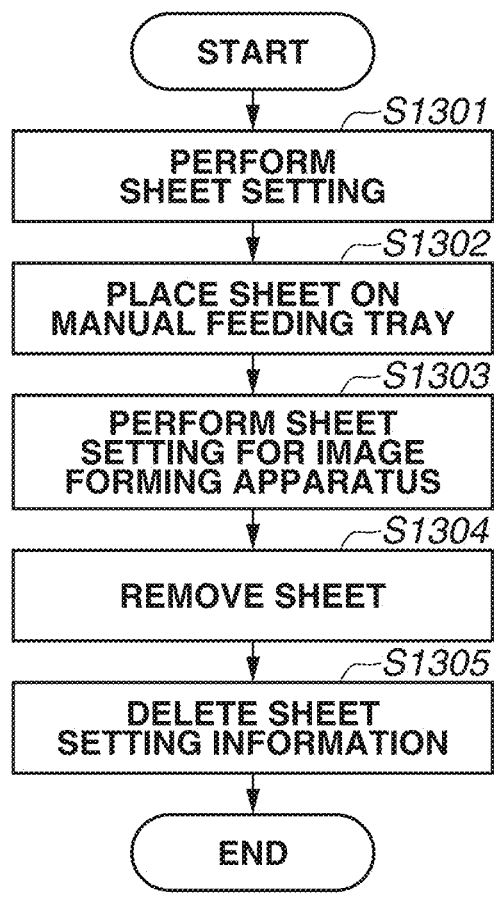
Figure 13B:
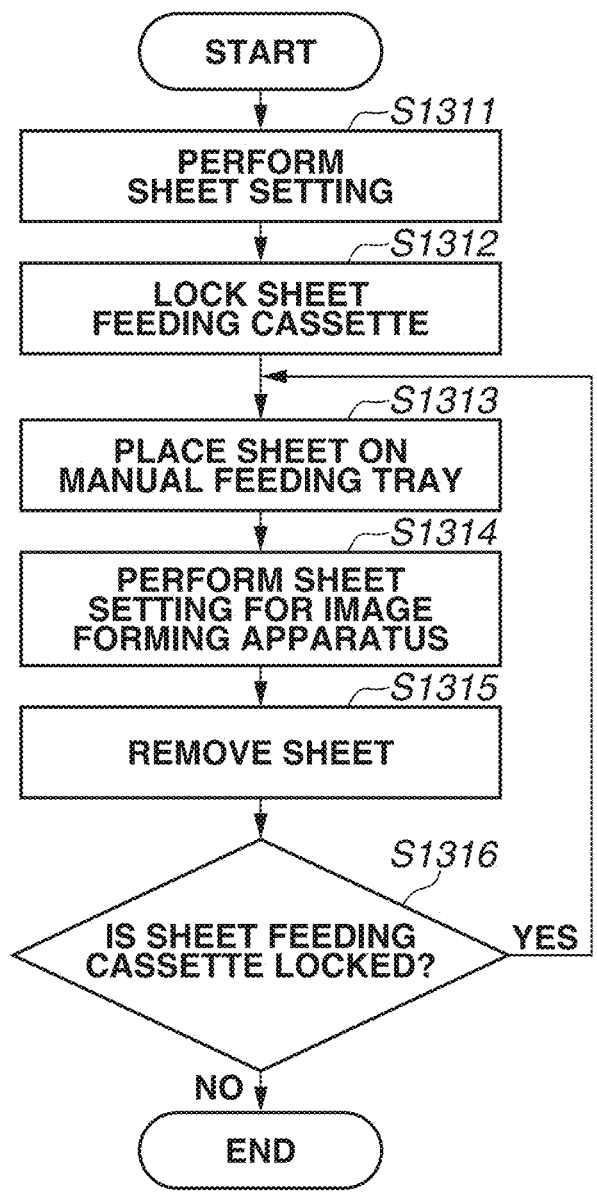

In step S1311 in FIG. 13B, the sheet management application receives a sheet setting from the operator. In step S1312, the sheet management application receives a sheet feeding cassette lock instruction from the operator. In step S1313, if the operator places a sheet on the manual feeding tray 116-5, the sheet management application receives a notification indicating the placement of the sheet, from the image forming apparatus. In step S1314, based on an instruction issued from the operator, the sheet management application transmits the sheet setting to the image forming apparatus and sets the sheet setting in the image forming apparatus.

At this time, a sheet remaining amount of 0 is assumed to be detected. If a sheet on the manual feeding tray is removed or sheets are used and run out, a sheet remaining amount of 0 is detected and notified to the sheet management application in step S1315. Even in such a case, if the sheet feeding cassette is locked (YES in step S1316), the processing returns to step S1313. If a sheet is placed on the manual feeding tray again in step S1313, the sheet management application sets the same sheet setting in the image forming apparatus in step S1314.

If the sheet feeding cassette is not locked, (NO in step S1316), a setting value for the manual feeding tray on the image forming apparatus side is automatically cleared in the image forming apparatus 103 and the sheet management application, and processing in the application ends.

FIG. 13C illustrates processing in a case where an operation is performed with the order of the process in step S1321 in which a sheet is placed on the manual feeding tray and the process in step S1322 in which a sheet setting is performed being changed to a reverse order of that in FIG. 13A. FIG. 13D illustrates processing in a case where an operation is performed with the order of the process in step S1331 in which a sheet is placed on the manual feeding tray and the process in step S1332 in which a sheet setting is performed being changed to a reverse order of that in FIG. 13A.

As described above, in the present exemplary embodiment, it becomes possible to flexibly switch between a sheet setting remotely set from, for example, a client computer, placing a sheet on a manual feeding tray, fixing a sheet setting, and setting a sheet setting each time a sheet setting is designated, and the operability for an operator is enhanced.

As described above, a manual sheet feeding unit has been described as an example of a predetermined sheet feeding unit. The description has been provided of an image forming apparatus capable of performing a predetermined notification to a user in a case where sheet information is not set for the manual sheet feeding unit when the placement of a sheet on the manual sheet feeding unit is detected.

An MFP is an example of an image forming apparatus. There is a first sheet information storage method for not cancelling a setting of sheet information in response to the detection of an absence of a sheet on a manual sheet feeding unit after the setting of the sheet information for the manual sheet feeding unit is set in an MFP. There is a second sheet information storage method for cancelling a setting of sheet information in response to the detection of an absence of a sheet on the manual sheet feeding unit after the setting for the sheet information for the manual sheet feeding unit is set in the MFP. One storage method is selected from among the at least two methods, but a storage method may be selected from among three or more storage methods. Furthermore, the description has been provided of a case where a setting for the manual sheet feeding unit of the MFP is executed based on the selected storage method. The selection includes selecting one storage method by shifting the state of a lock icon illustrated in FIGS. 11A to 11F to an enabled state, and selecting another storage method by disabling the lock icon, for example.

The MFP clears sheet information in response to the detection of an absence of a sheet on the manual sheet feeding unit.

When the first storage method is selected on the UI illustrated in any of FIGS. 11A to 11F, if a notification regarding the clear is received, sheet information to be set for the manual sheet feeding unit is transmitted to the MFP. The LAN controller 206 is used as an example of a transmission unit.

A client computer further includes an input unit that inputs sheet information corresponding to the manual sheet feeding unit. A sheet information input screen to be displayed by clicking the sheet feeding cassette button 414 illustrated in FIG. 4 can be used as an example the input unit.

The LAN controller may transmit sheet information input on the sheet information input screen, as sheet information to be set for the manual sheet feeding unit.

The MFP may include a notification unit that provides a notification for clearing sheet information. A client computer or a printing control apparatus has been described as an example of an information processing apparatus. In response to the reception of a clear notification for clearing sheet information that is notified from an image forming apparatus, in these apparatuses, sheet information stored in a sheet information storage unit may be cleared.

A second exemplary embodiment of the present disclosure will be described below. In the first exemplary embodiment, if a sheet feeding cassette button is locked in the sheet management application, and then, the operator notices that the setting is erroneous, when placing a sheet, the operator needs to go back to the client computer 101. This is bothersome especially when the client computer 101 is distant from the image forming apparatus 103. The present exemplary embodiment aims to enhance operability in such a case.

Figure 14:
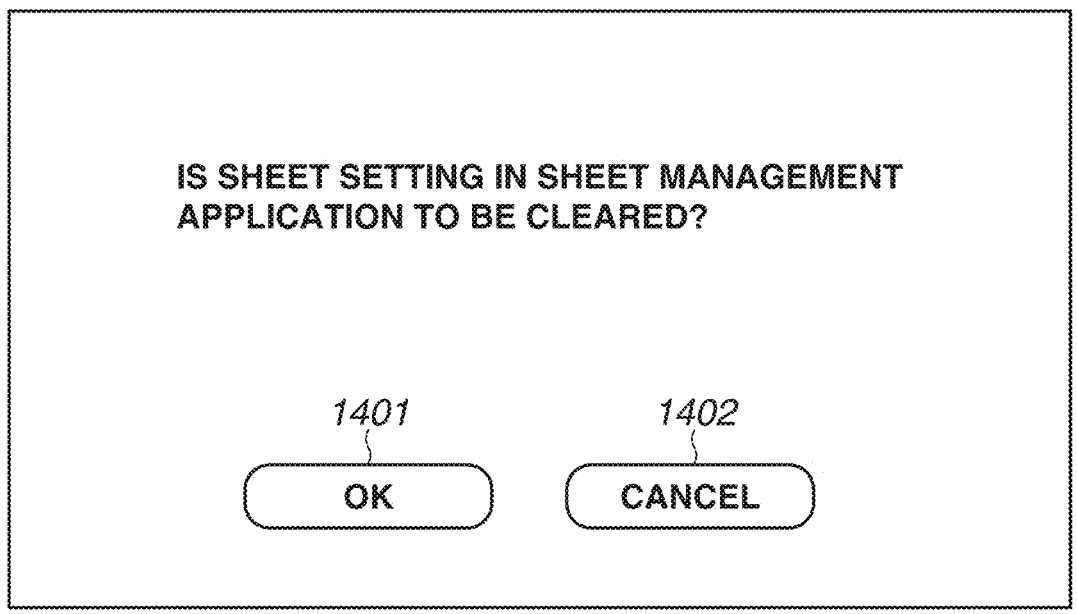
FIG. 14 is a diagram illustrating an example of display of a sheet information clear instruction according to a second exemplary embodiment.

FIG. 15 is a flowchart according to the second exemplary embodiment. In step S1501, the CPU 201 displays, on the operation panel 105, a screen for clearing sheet information in the sheet management application as illustrated in FIG. 14. The screen is displayed when a sheet information list is displayed on the operation panel 105 and a corresponding sheet feeding cassette is selected, for example. In step S1502, the CPU 201 determines whether an OK button 1401 has been pressed. If the OK button 1401 has been pressed (YES in step S1502), the processing proceeds to step S1503. If a cancel button 1402 has been pressed (NO in step S1502), the processing is ended. In step S1503, the CPU 201 instructs the sheet management application to clear the sheet setting of the manual feeding tray. A destination of the sheet management application is identified from an IP address set when a sheet is set on the manual feeding tray or an IP address connected in activation. The IP address is stored in the RAM 202. The sheet management application receives a sheet setting clear instruction from the image forming apparatus 103, and clears the sheet setting of the manual feeding tray. In step S1504, the CPU 201 clears the sheet information about the manual feeding tray. The clear includes deleting sheet information and writing "unset" or an indefinite value.

With the above-described configuration, it becomes possible for an operator to change a sheet setting without going back to the client computer, and it becomes possible to provide a more flexible sheet setting method to the operator.

According to the above-described exemplary embodiments, it is possible to provide a structure for flexibly setting sheet information about a sheet feeding unit, such as a manual feeding tray or an inserter.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-068840, filed Mar. 29, 2019, which is hereby incorporated by reference herein in its entirety.

What is claimed is:

1. An information processing apparatus configured to communicate with an image forming apparatus having a predetermined sheet feeding unit, the information processing apparatus comprising:
    a user interface that selects one storage method from among at least a first sheet information storage method and a second sheet information storage method;
    a communicator that transmits sheet information; and
    a controller that causes, after the first sheet information storage method is selected by the user interface and sheet information of a sheet placed on the predetermined sheet feeding unit is set by a user when the sheet is placed on the predetermined sheet feeding unit, the image forming apparatus to clear the set sheet information based on detection of an absence of the sheet placed on the predetermined sheet feeding unit,
    wherein the controller causes, after the second sheet information storage method is selected by the user interface and the sheet information of the sheet placed on the predetermined sheet feeding unit is set by the user when the sheet is placed on the predetermined sheet feeding unit, the image forming apparatus to set the sheet information for the predetermined sheet feeding unit when the absence of the sheet placed on the predetermined sheet feeding unit is detected, where the set sheet information is used for another sheet placed on the predetermined sheet feeding unit,
    wherein the image forming apparatus is configured to clear the sheet information based on detection of the absence of the sheet placed on the predetermined sheet feeding unit,
    wherein, in a case where the second sheet information storage method is selected by the user interface and a notification that the image forming apparatus cleared the sheet information is received, the communicator transmits, to the image forming apparatus, the sheet information as sheet information to be set for the predetermined sheet feeding unit,
    wherein the user interface is configured to input the sheet information corresponding to the predetermined sheet feeding unit, and
    wherein, in a case where the sheet information is input by the user interface, the communicator transmits the input sheet information as the sheet information to be set for the predetermined sheet feeding unit.

2. The information processing apparatus according to claim 1, wherein the predetermined sheet feeding unit is a manual feeding tray.

3. A method for an information processing apparatus configured to communicate with an image forming apparatus having a predetermined sheet feeding unit, the method comprising:
    selecting one storage method from among at least a first sheet information storage method and a second sheet information storage method;
    causing, after the first sheet information storage method is selected and sheet information of a sheet placed on the predetermined sheet feeding unit is set by a user when the sheet is placed on the predetermined sheet feeding unit, the image forming apparatus to clear the set sheet information based on detection of an absence of the sheet placed on the predetermined sheet feeding unit;
    causing, after the second sheet information storage method is selected and the sheet information of the sheet placed on the predetermined sheet feeding unit is set by the user when the sheet is placed on the predetermined sheet feeding unit, the image forming apparatus to set the sheet information for the predetermined sheet feeding unit when the absence of the sheet placed on the predetermined sheet feeding unit is detected, where the set sheet information is used for another sheet placed on the predetermined sheet feeding unit, wherein the image forming apparatus is configured to clear the sheet information based on detection of the absence of the sheet placed on the predetermined sheet feeding unit;

transmitting, in a case where the second sheet information storage method is selected and a notification that the image forming apparatus cleared the sheet information is received, the sheet information to the image forming apparatus as sheet information to be set for the predetermined sheet feeding unit; and transmitting, in a case where the sheet information is input by a user interface of the information processing apparatus, the input sheet information as the sheet information to be set for the predetermined sheet feeding unit.

4. The method according to claim 3, wherein the predetermined sheet feeding unit is a manual feeding tray.

5. An information processing system comprising:
a predetermined sheet feeding unit having:
a user interface that selects one storage method from among at least a first sheet information storage method and a second sheet information storage method, and
a controller that causes, after the first sheet information storage method is selected by the user interface and sheet information of a sheet placed on the predetermined sheet feeding unit is set by a user when the sheet is placed on the predetermined sheet feeding unit, the set sheet information to be cleared based on detection of an absence of the sheet placed on the predetermined sheet feeding unit, wherein the controller causes, after the second sheet information storage method is selected by the user interface and the sheet information of the sheet placed on the predetermined sheet feeding unit is set by the user when the sheet is placed on the predetermined sheet feeding unit, the sheet information to be set for the predetermined sheet feeding unit when the absence of the sheet placed on the predetermined sheet feeding unit is detected, where the set sheet information is used for another sheet placed on the predetermined sheet feeding unit, wherein the controller is configured to clear the sheet information based on detection of the absence of the sheet placed on the predetermined sheet feeding unit, wherein, in a case where the second sheet information storage method is selected by the user interface and a notification that the controller cleared the sheet information is received, the sheet information is transmitted to the controller as sheet information to be set for the predetermined sheet feeding unit, wherein the user interface is configured to input the sheet information corresponding to the predetermined sheet feeding unit, and wherein, in a case where the sheet information is input by the user interface, the input sheet information is transmitted as the sheet information to be set for the predetermined sheet feeding unit.

* * * * *